(12) United States Patent
Lee et al.

(10) Patent No.: US 11,162,809 B2
(45) Date of Patent: Nov. 2, 2021

(54) APPARATUS, METHOD, COMPUTER PROGRAM, AND COMPUTER READABLE RECORDING MEDIUM FOR ROUTE GUIDANCE

(71) Applicant: THINKWARE CORPORATION, Seongnam-si (KR)

(72) Inventors: Ki Wook Lee, Seongnam-si (KR); Hye Kyung Byun, Seongnam-si (KR); Tae Kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 216 days.

(21) Appl. No.: 16/464,059

(22) PCT Filed: Nov. 24, 2017

(86) PCT No.: PCT/KR2017/013557
§ 371 (c)(1),
(2) Date: May 24, 2019

(87) PCT Pub. No.: WO2018/097664
PCT Pub. Date: May 31, 2018

(65) Prior Publication Data
US 2019/0383630 A1    Dec. 19, 2019

(30) Foreign Application Priority Data

Nov. 26, 2016  (KR) .................. 10-2016-0158831
Dec. 20, 2016  (KR) .................. 10-2016-0175039
Nov. 23, 2017  (KR) .................. 10-2017-0157659

(51) Int. Cl.
*G01C 21/36* (2006.01)
*G08G 1/0968* (2006.01)
(Continued)

(52) U.S. Cl.
CPC .......... *G01C 21/36* (2013.01); *G08G 1/0968* (2013.01)

(58) Field of Classification Search
USPC ........................................................ 701/410
See application file for complete search history.

(56) References Cited

U.S. PATENT DOCUMENTS

2005/0171688 A1* 8/2005 Fujita ................. G01C 21/3602
  701/533
2013/0201316 A1* 8/2013 Binder .................... H04L 67/12
  348/77
(Continued)

FOREIGN PATENT DOCUMENTS

EP    0803853 A1    10/1997
EP    1041528 A2    10/2000
(Continued)

OTHER PUBLICATIONS

Extended (Supplementary) European Search Report dated Jul. 7, 2020, issued in counterpart EP application No. 17873107.1. (11 pages).
(Continued)

*Primary Examiner* — Tyler D Paige
(74) *Attorney, Agent, or Firm* — Westerman, Hattori, Daniels & Adrian, LLP

(57) ABSTRACT

Disclosed herein are an apparatus and a method for route guidance. The method for route guidance includes receiving a destination from a user; determining a current position of
(Continued)

10 a vehicle; calculating a driving route from the current position to the destination; when an intersection exists within in a predetermined distance on the driving route while performing the route guidance according to the calculated driving route, confirming a ranking of a search link positioned on the calculated driving route among search links exiting from an end node existing on the intersection; comparing rotation direction information of the search link corresponding to the confirmed ranking of the search link with moving direction information of a lane on which the vehicle is positioned; and performing lane change guidance of the vehicle according to a comparison result of the rotation direction information and the moving direction information.

20 Claims, 17 Drawing Sheets

(51) Int. Cl.
*B60W 60/00* (2020.01)
*B60W 30/18* (2012.01)

(56) References Cited

U.S. PATENT DOCUMENTS

| | | | |
|---|---|---|---|
| 2015/0221220 A1* | 8/2015 | Arai | G08G 1/09 340/907 |
| 2016/0358479 A1* | 12/2016 | Riedelsheimer | G08G 1/0145 |
| 2017/0102245 A1* | 4/2017 | Iwata | G08G 1/096775 |
| 2019/0383630 A1* | 12/2019 | Lee | G08G 1/0968 |

FOREIGN PATENT DOCUMENTS

| | | |
|---|---|---|
| EP | 1041528 A3 | 4/2001 |
| JP | 2009-047491 A | 3/2009 |
| JP | 2011-106929 A | 6/2011 |
| JP | 2014-089131 A | 5/2014 |
| KR | 10-2015-0054022 A | 5/2015 |
| KR | 10-2015-0114083 A | 10/2015 |

OTHER PUBLICATIONS

International Search Report dated Mar. 22, 2018, issued in counterpart PCT application No. PCT/KR2017/013557 with English translation. (6 pages).

\* cited by examiner

APPARATUS, METHOD, COMPUTER PROGRAM, AND COMPUTER READABLE RECORDING MEDIUM FOR ROUTE GUIDANCE

TECHNICAL FIELD

The present invention relates to an apparatus, a method, a computer program, and a computer-readable recording medium for route guidance, and more particularly, to an apparatus, a method, a computer program, and a computer-readable recording medium for route guidance that efficiently perform the route guidance in units of lanes.

BACKGROUND ART

A driver uses a route guidance service through navigation or a smart device mounted on a vehicle, and the navigation displays a position of the user according to a movement on a map, and guides a moving direction of the moving user with a voice.

Meanwhile, the conventional navigation recognizes a road as a link for route guidance to guide a route and does not guide the route for each lane, and therefore, the conventional navigation does not consider the route guidance according to a traffic condition or direction information for each lane. In order to perform the route guidance for each lane, information on lane data such as lanes of the road, a direction of each lane, and the like should be built in advance, and an exact position of a running vehicle should be positioned and matched to the lane on which the vehicle is driving. In addition, detailed data on whether or not it is necessary to change the direction of the vehicle on the driving route, or whether or not the vehicle is positioned on the lane where the vehicle may change the direction when it is necessary to change the direction should be secured.

DISCLOSURE

Technical Problem

An object of the present invention is to provide an apparatus, a method, a computer program, and a computer readable recording medium that perform route guidance in units of lanes.

Another object of the present invention is to provide an apparatus, a method, a computer program, and a computer readable recording medium that efficiently perform route guidance by making a route determination method and a route guidance method different from each other.

Still another object of the present invention is to provide an apparatus, a method, a computer program, and a computer readable recording medium that perform route guidance capable of easily knowing a direction change point in the route guidance.

Yet still another object of the present invention is to provide an apparatus, a method, a computer program, and a computer readable recording medium that efficiently perform route guidance by considering direction information for each lane before entering an intersection in route guidance.

Technical Solution

According to an exemplary embodiment of the present invention, a method for route guidance may include receiving a destination from a user; determining a current position of a vehicle; calculating a driving route from the current position to the destination; when an intersection exists within in a predetermined distance on the driving route while performing the route guidance according to the calculated driving route, confirming a ranking of a search link positioned on the calculated driving route among search links exiting from an end node existing on the intersection; comparing rotation direction information of the search link corresponding to the confirmed ranking of the search link with moving direction information of a lane on which the vehicle is positioned; and performing lane change guidance of the vehicle according to a comparison result of the rotation direction information and the moving direction information.

The confirming of the ranking of the search link may include: confirming a lane identifier (ID) of the lane on which the vehicle is positioned; confirming a search ID including the confirmed lane link ID; confirming the number of search links exiting from an end node of a search link corresponding to the confirmed search link ID; and sequentially searching for the search links exiting from the end node in a clockwise direction or a counterclockwise direction based on the end node.

The comparing of the rotation direction information with the moving direction information may include: confirming the rotation direction information corresponding to the order of the search link coinciding the search link positioned on the driving route among the searched search links; and comparing whether or not the confirmed rotation direction information coincides with the moving direction information corresponding to the lane on which the vehicle is positioned.

The performing of the lane change guidance of the vehicle may include: when as the comparison result, the rotation direction information of the search link corresponding to the confirmed ranking of the search link does not coincide with the moving direction information of the lane on which the vehicle is positioned, determining a driving lane having moving direction information coinciding with the rotation direction information of the search link corresponding to the confirmed ranking of the search link; and providing lane change guidance to the determined driving lane.

The destination and the current position of the vehicle may be received through a user terminal.

The performing of the lane change guidance of the vehicle according to the comparison result of the rotation direction information and the moving direction information may include: transmitting a guidance message for lane change of the vehicle to a control unit of the vehicle; and performing, by the control unit of the vehicle, an operation associated with the lane change according to the guidance message.

The comparing of the rotation direction information with the moving direction information may include: confirming rotation direction information corresponding to a search link coinciding with the search link positioned on the driving route among the searched search links; and confirming whether or not the confirmed rotation direction information includes the moving direction information corresponding to the lane on which the vehicle is positioned.

The performing of the lane change guidance of the vehicle may include, when as the comparison result, the rotation direction information of the search link corresponding to the confirmed ranking of the search link does not include the moving direction information of the lane on which the vehicle is positioned, determining a driving lane having moving direction information coinciding with the rotation direction information of the search link corresponding to the confirmed ranking of the search link; and providing lane change guidance to the determined driving lane.

According to another exemplary embodiment of the present invention, an apparatus for route guidance may include: a route calculation unit; a communication unit performing communication with a user terminal provided in a vehicle; and a control unit obtaining destination information of the vehicle and position information of the vehicle through the communication unit, controlling the route calculation unit to calculate a driving route from a current position to a destination, and transmitting the calculated driving route to the user terminal through the communication unit, wherein the route calculation unit is configured to: when an intersection exists within in a predetermined distance on the driving route while performing the route guidance according to the calculated driving route, confirm a ranking of a search link positioned on the calculated driving route among search links exiting from an end node existing on the intersection; compare rotation direction information of the search link corresponding to the confirmed ranking of the search link with moving direction information of a lane on which the vehicle is positioned; and perform lane change guidance of the vehicle according to a comparison result of the rotation direction information and the moving direction information.

The route calculation unit may be configured to: confirm a lane identifier (ID) of the lane on which the vehicle is positioned; confirm a search ID including the confirmed lane link ID; confirm the number of search links exiting from an end node of a search link corresponding to the confirmed search link ID; and sequentially search for the search links exiting from the end node in a clockwise direction or a counterclockwise direction based on the end node.

The route calculation unit may be configured to: confirm the rotation direction information corresponding to the order of the search link coinciding the search link positioned on the driving route among the searched search links; and compare whether or not the confirmed rotation direction information coincides with the moving direction information corresponding to the lane on which the vehicle is positioned.

The route calculation unit may be configured to: when as the comparison result, the rotation direction information of the search link corresponding to the confirmed ranking of the search link does not coincide with the moving direction information of the lane on which the vehicle is positioned, determine a driving lane having moving direction information coinciding with the rotation direction information of the search link corresponding to the confirmed ranking of the search link; and provide lane change guidance to the determined driving lane.

The route calculation unit may transmit a guidance message for lane change of the vehicle to a control unit of the vehicle, and the control unit of the vehicle may perform an operation associated with the lane change according to the guidance message.

The apparatus may further include a storage unit storing map information for guiding a route on which the vehicle drives, storing information on search links and information on lane links existing on the map information, and storing rotation direction information corresponding to the search links and moving direction information corresponding to the lane links.

According to still another exemplary embodiment of the present invention, an apparatus for route guidance may include: a communication unit performing communication with a server; a positioning unit measuring a position of a vehicle; a route guidance performing unit performing the route guidance; and a control unit controlling the position of the vehicle and destination information input from a user to be transmitted to the server through the communication unit, and controlling the route guidance performing unit to perform the route guidance according to route guidance information to the destination received from the server, wherein the route guidance information includes information for: when an intersection exists within in a predetermined distance on the driving route, confirming a ranking of a search link positioned on the calculated driving route among search links exiting from an end node of the lane link existing on the intersection; comparing rotation direction information of the search link corresponding to the confirmed ranking of the search link with moving direction information of a lane on which the vehicle is positioned; and performing lane change guidance of the vehicle according to a comparison result of the rotation direction information and the moving direction information.

The apparatus may further include an interface unit transmitting the route guidance information to the control unit of the vehicle, wherein the control unit of the vehicle controls the vehicle to be driven according to the route guidance information.

According to yet still another exemplary embodiment of the present invention, a method for route guidance may include: receiving a destination from a user; measuring a current position of a vehicle; calculating a driving route from the measured current position to the destination; confirming a search link on which the vehicle is currently driving and a future search link connected to a current search link on which the vehicle is currently driving and positioned on the driving route, while the vehicle drives on a route according to the calculated driving route; confirming a moving direction from the current search link to the future search link; comparing the confirmed moving direction to the future search link with moving direction information of a lane on the search link on which the vehicle is currently driving; and determining whether to change the lane of the vehicle according to a comparison result of the confirmed moving direction and the moving direction information, wherein the driving route includes at least two search links for the driving route from the measured current position to the destination.

The confirming of the future search link may include: identifying a current search link identifier of a road corresponding to the measured current position of the vehicle; and confirming the future search link positioned to be connected to the current search link according to the driving route among search links exiting from an end node of the identified current search link identifier.

The confirming of the moving direction may include: calculating an angle between a coordinate of an end node of the current search link and a coordinate of an end node of the future search link which are predetermined on a map based on the moving direction of the vehicle; and confirming the moving direction according to whether or not the calculated angle is included in a predetermined angle range.

The angle may be calculated by using a tangent function.

The moving direction may be: a right turn direction when the calculated angle is between 45 degrees and 135 degrees based on the moving direction, a left turn direction when the calculated angle is between 225 degrees and 315 degrees based on the moving direction, a straight ahead direction when the calculated angle is between 315 degrees and 45 degrees, and a U-turn direction when the calculated angle is between 135 degrees and 225 degrees.

The performing of the lane change guidance may include: determining a lane corresponding to a lane identifier having moving direction information coinciding the moving direction, when the moving direction and the moving direction information are different from each other; and guiding the user to change the lane to the determined lane. According to yet still another exemplary embodiment of the present invention, a method for route guidance may include: storing map data including search link data distinguished in units of roads and lane link data distinguished in units of at least one lane constituting the road; generating a route to a destination of a moving object based on the search link data; generating rotation direction information of the moving object at a point where it is required to determine whether to change a direction of the moving object on the generated route; determining, by the moving object, a current search link to which a lane link corresponding to a current position belongs; determining a future search link connected to the current search link and positioned on a driving route of the moving object; and determining rotation direction information between the current search link and the future search link from the generated rotation direction information and guiding whether to change the lane based on the determined rotation direction information and moving direction information of a lane link on which the vehicle is currently positioned.

The search link data may include a search link identifier, a start node identifier of the search link, and an end node identifier of the search link.

The lane link data may include a lane link identifier, a search link identifier to which the lane link belongs, and lane moving direction information.

The point where it is required to determine whether to change the direction of the moving object may be an intersection.

The determining of, by the moving object, the current search link to which the lane link corresponding to the current position belongs may include: obtaining a position of the moving object using a positioning device; and confirming a lane link on which the moving object is currently positioned by applying the obtained position of the moving object to:

$$L(x,y)-\alpha \leq C(x,y) \leq L(x,y)+\alpha \quad \text{[Equation 1]}$$

wherein C(x, y) is a position of the moving object, L(x, y) denotes a position of a lane link corresponding to a currently measured position of the vehicle, and α is a position matching tolerance.

The rotation direction information may include straight ahead, left turn, right turn, and u-turn.

In the generating of the rotation direction information, when the moving object approaches within a predetermined distance from the intersection, the rotation direction information may be generated.

In the generating of the rotation direction information, when a destination of the moving object is set, the rotation direction information may be generated for all sections from the current position of the moving object to the destination.

According to yet still another exemplary embodiment of the present invention, a computer readable recording medium on which a program for executing the method for route guidance is recorded may be further included.

According to yet still another exemplary embodiment of the present invention, a program stored in a computer readable recording medium for executing the method for route guidance may be further included.

Advantageous Effects

According to the present invention, since the route guidance is performed by separating the route search method and the method of guiding the searched route, the data throughput and the data processing time may be shortened and the route guidance may be efficiently performed.

In addition, since the respective sections and the respective lanes of the road are distinguished from each other by identifiers (IDs) such as a search link ID and lane link ID, and rotation direction information on each search link ID and moving direction information on the lane link ID are determined in advance and stored, it is possible to provide information for safely changing the lane to the user in advance according to the position of the user during the route guidance.

BEST MODE

Hereinafter, exemplary embodiments of the present invention will be described in detail with reference to the accompanying drawings. In describing the present invention, when it is decided that a detailed description for the known functions or configurations related to the present invention may unnecessarily obscure the gist of the present invention, a detailed description thereof will be omitted.

Figure 1:
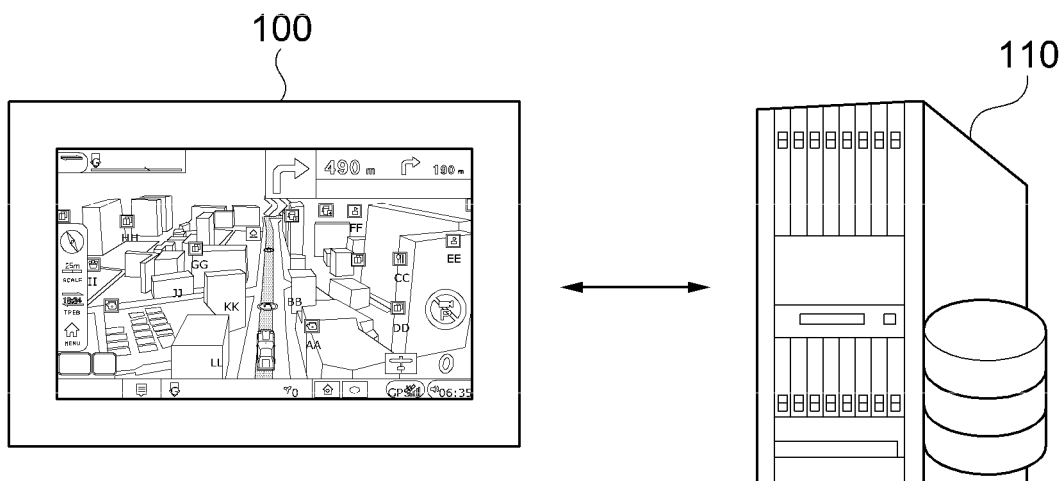
FIG. 1 is a diagram illustrating a route guidance system according to an exemplary embodiment of the present invention.

FIG. 1 is a diagram illustrating a route guidance system 10 according to an exemplary embodiment of the present invention.

Referring to FIG. 1, a route guidance system 10 according to the present invention includes a route guidance apparatus 100 and a server 110.

The route guidance apparatus 100 is an apparatus for guiding a route so that a user may reach a destination, and corresponds to an apparatus capable of displaying route information to the user such as navigation, a smart phone, a smart pad, a smart glass, and a head up display (HUD), for example. In addition, the route guidance apparatus 100 may also be mounted in a vehicle by the user or may also be mounted in advance by a manufacturer of the vehicle. In the present invention, the route guide apparatus 100 uses high-precision map data for route guidance and a high-precision map is a map constructed by using a shape of a road obtained by scanning the road and fixed objects adjacent to the road, and positions and shape information of facilities adjacent to the road through light detection and ranging (Lidar) equipment or the like, unlike existing maps. The high-precision map in the present invention is constructed to include information on each lane and direction information on each lane. In this case, using the high-precision map data, the route guidance apparatus 100 may display route information in units of lanes. The route guidance apparatus 100 may be mounted in a moving object and may transmit route information to a destination selected by the user, position information of the moving object, driving time information, driving speed information, and the like to the server 110. Here, the moving bodies may include movable objects such as vehicles, people, bicycles, ships, trains, and the like. Hereinafter, for convenience of explanation, a case in which the moving object is a vehicle will be described as an example.

In addition, a lane is a concept distinguished from a line and the lane means a portion of a road on which the vehicle drives, and when the road is constituted by a plurality of lanes, each of the plurality of lanes may be distinguished by lines. In addition, the line means a band-shaped line for distinguishing the plurality of lanes included in the road, and a driver may drive safely and smoothly by using the lines.

The server 110 may collect and process traffic situation information and transmit it to the route guidance apparatus 100, and may update the high-precision map data or firmware by transmitting corresponding information to the route guidance apparatus 100 when the high-precision map data or firmware needs to be updated. In particular, since the high-precision map provides shape information for all fixed objects in the road, it is necessary to quickly apply changes in a road environment, such as accident zones and construction zones. Therefore, the server 110 may periodically check whether or not the high-precision map data needs to be updated and transmit the updated information to the route guidance apparatus 100.

Figure 2:
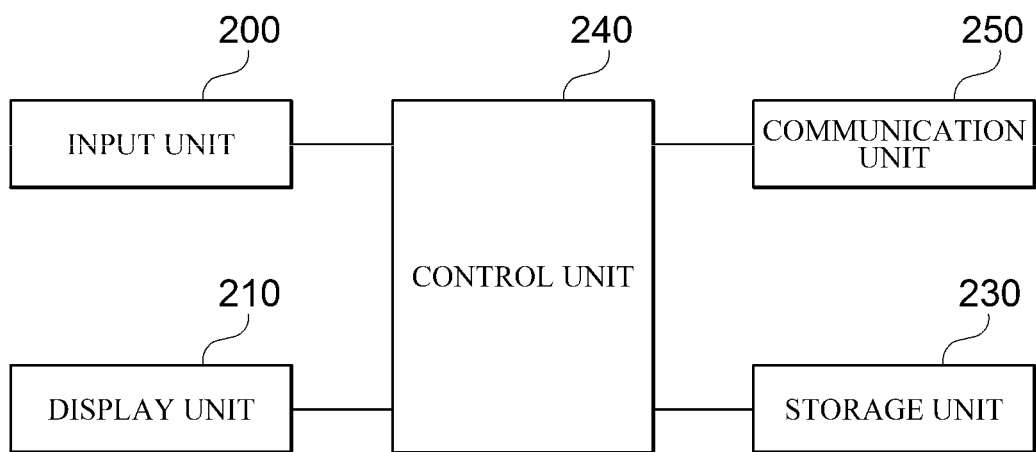
FIG. 2 is a diagram illustrating a configuration of a route guidance apparatus according to an exemplary embodiment of the present invention.

FIG. 2 is a diagram illustrating a configuration of the route guidance apparatus 100 according to an exemplary embodiment of the present invention.

Referring to FIG. 2, the route guidance apparatus 100 according to the present invention includes an input unit 200, a display unit 210, a storage unit 230, a control unit 240, and a communication unit 250.

The input unit 200 serves to convert a physical input from the outside into a specific electric signal, and may receive a user input such as a user's touch, push operation, voice, or the like, or sound generated from the inside or the outside of the vehicle. Here, the input unit 200 may include all or some of a user input unit (not shown) and a microphone unit (not shown).

The user input unit may receive a user input such as a touch, a push operation, or the like. Here, the user input unit may be implemented by using at least one of a form of various buttons, a touch sensor receiving a touch input, and a proximity sensor receiving an approaching motion. The microphone unit may receive a voice of the user and a sound generated from the inside and the outside of the vehicle.

The display unit 210 may display route information by using the high-precision map data, and may be formed integrally with the route guidance apparatus 100 or installed separately from the route guidance apparatus 100, such as a head up display (HUD).

The communication unit 250 is to communicate with other apparatuses such as the server 110 and the like, and may specifically include all or some of a position data unit (not shown), a wireless Internet unit (not shown), a broadcasting transmitting and receiving unit (not shown), a mobile communication unit (not shown), a local area network unit (not shown), and a wired communication unit (not shown). The position data unit obtains position data through a global navigation satellite system (GNSS). The GNSS means a navigation system that may calculate a position of a receiving terminal using a radio signal received from an artificial satellite. Detailed examples of the GNSS may include a global positioning system (GPS), a differential GPS (DGPS), Galileo, a global orbiting navigational satellite system (GLONASS), COMPASS, an Indian regional navigational satellite system (IRNSS), a quasi-zenith satellite system (QZSS), and the like, depending on an operating subject thereof, and in the present invention, it is preferable to detect a position of the object in the range of 10 to 25 cm. The position data unit may obtain position data by receiving GNSS signals serviced by a usage region. Alternatively, the position data unit (not shown) may also obtain the position data through communication with a base state or an access point (AP) in addition to GNSS.

The wireless Internet unit accesses a wireless Internet to obtain or transmit data, and the wireless Internet that may be accessed through the wireless Internet unit may be a wireless local area network (WLAN), a wireless broadband (Wibro), a world interoperability for microwave access (Wimax), a high speed downlink packet access (HSDPA), or the like. The broadcasting transmitting and receiving unit transmits and receives broadcasting signals through a variety of broadcasting systems, and the broadcasting system that may transmit and receive the broadcasting signals through the broadcasting transmitting and receiving unit may be a digital multimedia broadcasting terrestrial (DMBT), a digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit may include traffic data, living data, and the like.

The mobile communication unit may access and communicate with a mobile communication network according to various mobile communication standards such as $3^{rd}$ generation partnership project (3GPP), $3^{rd}$ generation partnership project 2 (3GPP2), long term evolution (LTE), 5G, and the like. The local area network unit may perform local area communication with peripheral devices according to various communication schemes such as Bluetooth, radio frequency identification (RFID), infrared data association (IrDA), ultra wideband (UWB), ZigBee, Wi-Fi, and the like. The wired communication unit is an interface apparatus capable of being wired-connected with another apparatus, and may be a module such as USB, IEEE, HDMI, or the like which may communicate through a USB port.

The storage unit 230 stores various data and applications, and may store, for example, an operation system (OS), a route search application, map data, searched route data, an image, and the like. The storage unit 230 may be implemented by a detachable storage element such as a USB memory, or the like, as well as an embedded storage element such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The control unit 240 determines and displays a route to the destination according to an input of the user, and generally controls the route guidance apparatus 100 according to the present invention such as guiding a lane change so that the vehicle may be positioned on a lane where a direction change is possible when a direction change is necessary.

Figure 3:
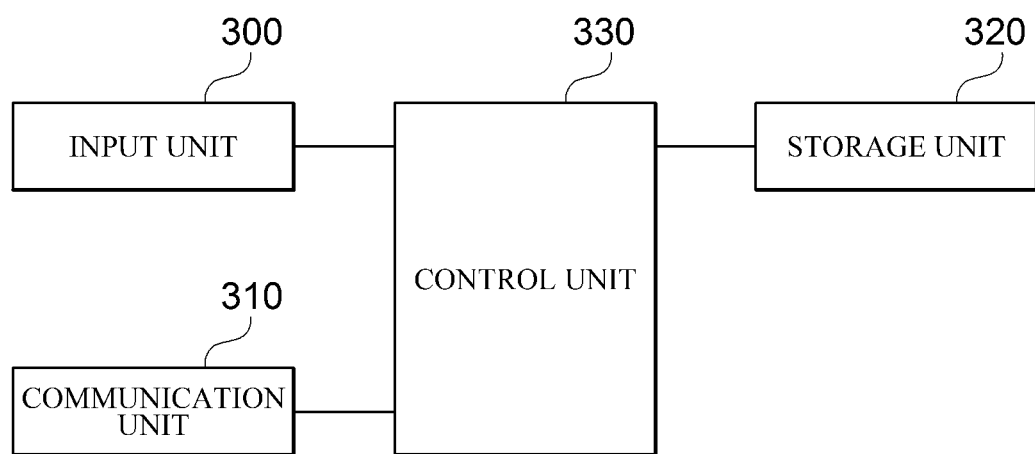
FIG. 3 is a diagram illustrating a configuration of a server according to an exemplary embodiment of the present invention.

FIG. 3 is a diagram illustrating a configuration of the server 110 according to an exemplary embodiment of the present invention.

Referring to FIG. 3, the server 110 according to the present invention includes an input unit 300, a communication unit 310, a storage unit 320, and a control unit 330.

The input unit 300 may receive commands and the like for performing operations from the user, and may be formed of a keypad, a dome switch, a touch pad (resistive or capacitive), a jog wheel, a jog switch, a push button, or the like.

The communication unit 310 is to communicate with other apparatuses such as the route guidance apparatus 100 and the like, and may specifically include all or some of a wireless Internet unit (not shown), a broadcasting transmitting and receiving unit (not shown), a mobile communication unit (not shown), a local area network unit (not shown), and a wired communication unit (not shown). A description of each component is the same as that described above.

The storage unit 320 stores various data and applications, and may store, for example, an operation system (OS), a route search program, map data, searched route data, and the like. The storage unit 230 may be implemented by a detachable mobile storage means such as the USB memory, or the like as well as the embedded storage element, as described above. In addition, the storage unit 320 may be implemented in the form of external database server connected to the server 110.

The control unit 330 processes the collected traffic situation information to transmit it to the route guidance apparatus 100, and provides guidance information on a calculated driving route to the destination to the vehicle through the communication unit 310. In addition, the control unit 330 periodically detects a current position of the vehicle, and checks whether there is a point requiring a direction change such as an intersection within a predetermined distance from the current position of the vehicle. In addition, when there is a point requiring the direction change within the predetermined distance from the vehicle, the control unit 330 confirms a search link identifier and a lane link identifier of the road on which the vehicle is positioned, and transmits lane change information guiding the lane change to a lane on which the vehicle may change a direction to the route guidance apparatus 100 through the communication unit 310 so that the vehicle may easily enter the point requiring the direction change such as the intersection according to direction information of the confirmed lane link identifier. In addition, the control unit 330 generally controls the server 110 according to an exemplary embodiment of the present invention.

A method of determining and guiding an intersection entering direction according to a current driving lane on which the vehicle is positioned will hereinafter be described.

Figure 4:
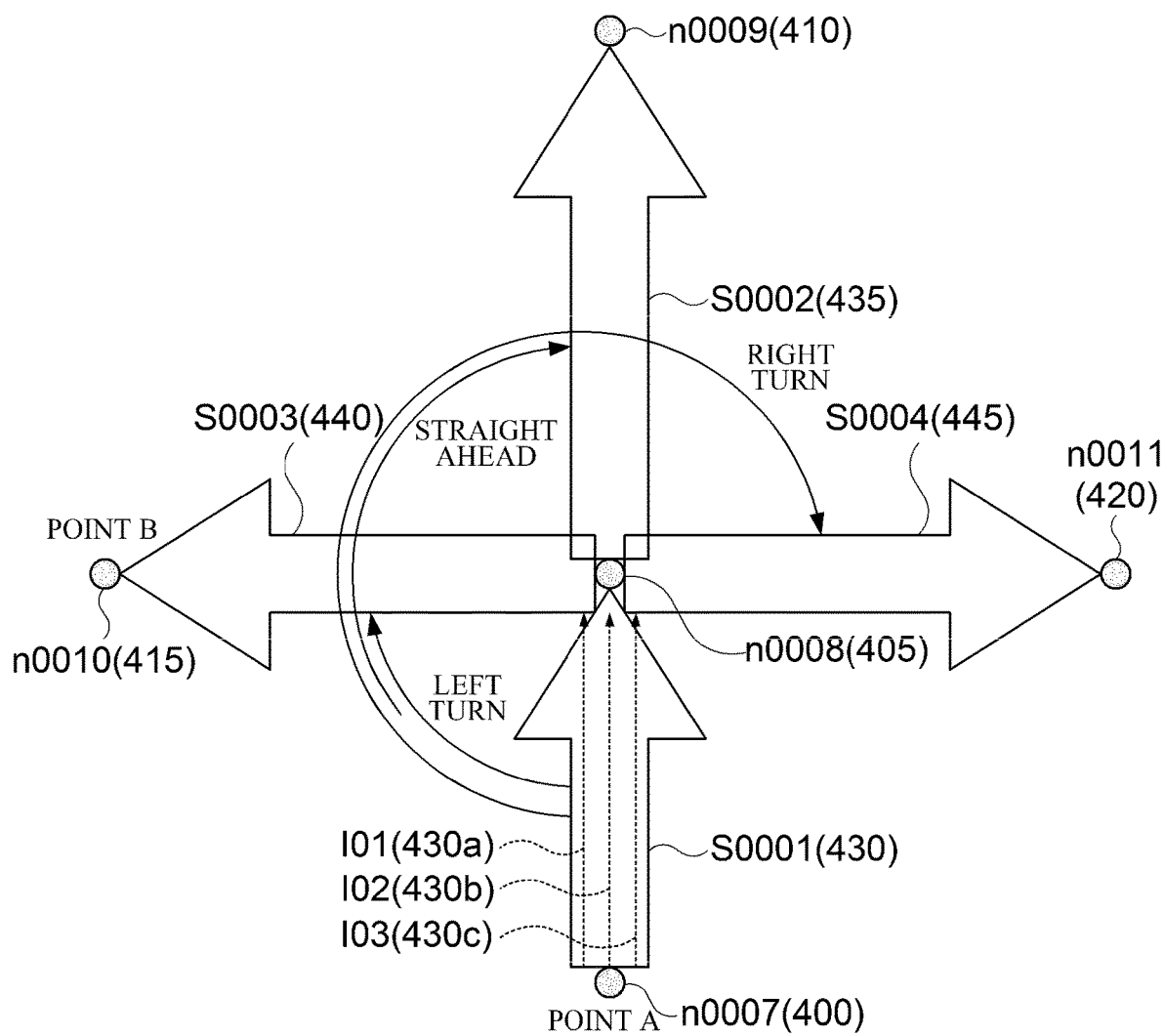
FIGS. 4 to 6 are diagrams for describing a route guidance method according to an exemplary embodiment in the present invention.
Figure 5:
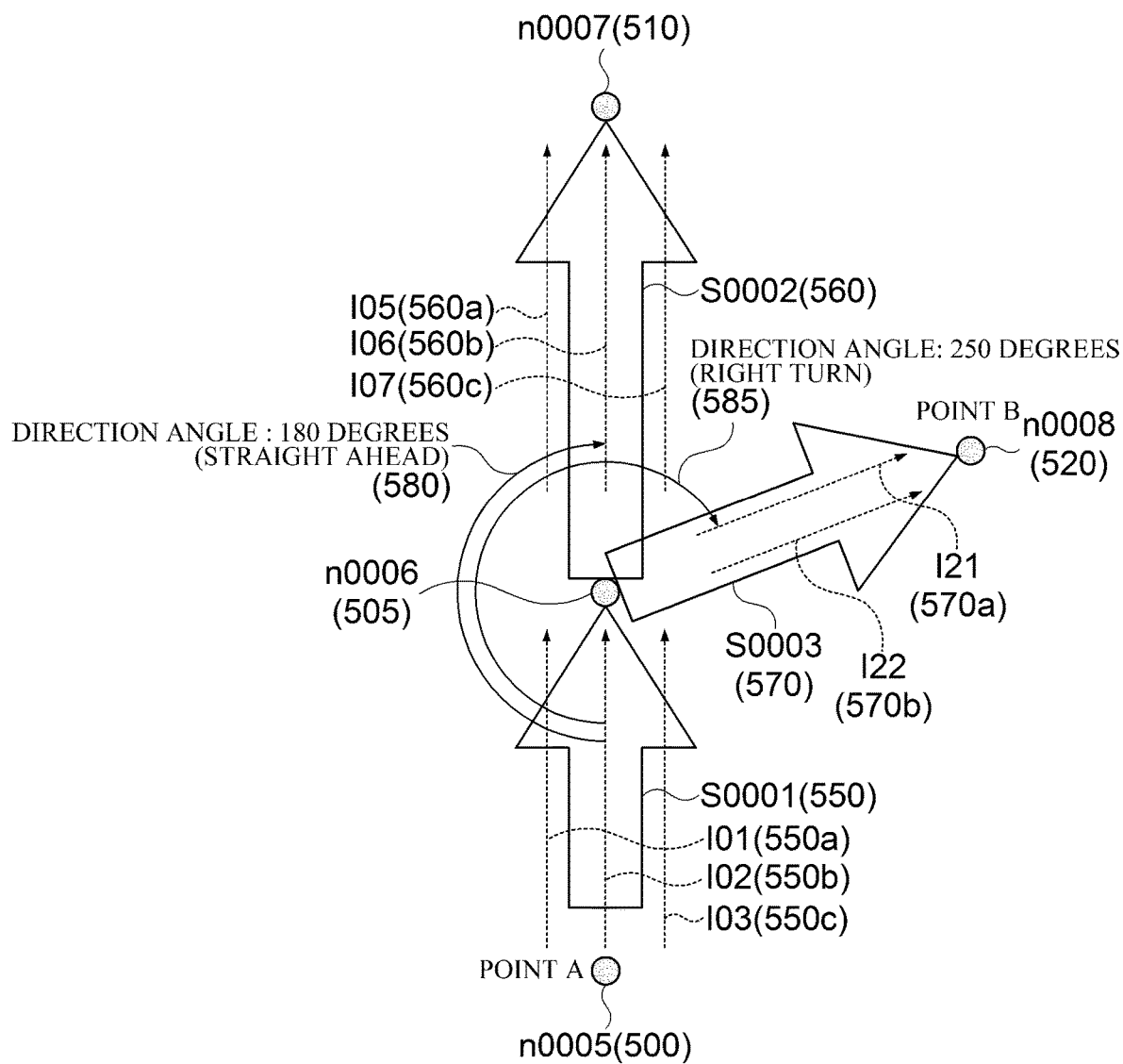
Figure 6:
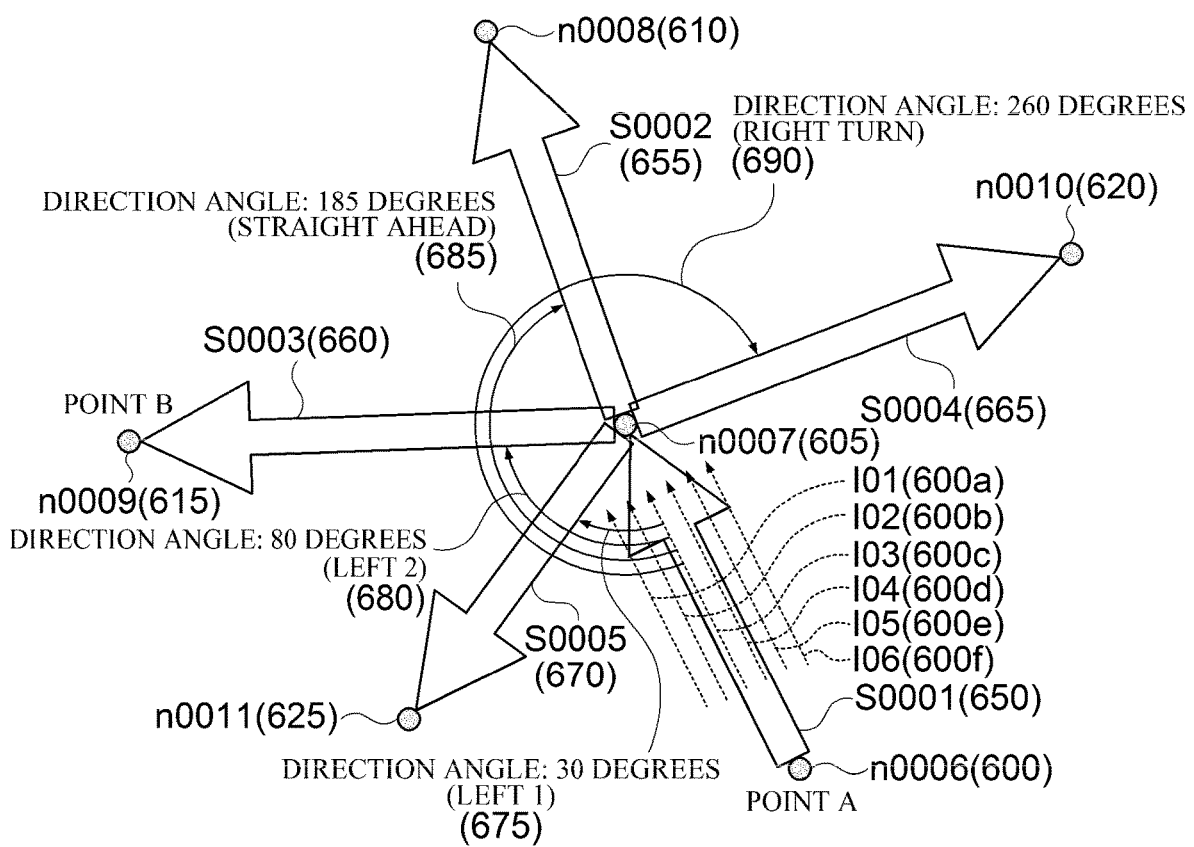

FIGS. 4 to 6 are diagrams for describing a route guidance method according to an exemplary embodiment in the present invention.

According to the present invention, when the user inputs a departure point, a destination, and the like to the route guidance apparatus, the route guidance apparatus or the server searches for a route from the departure point to the destination and performs guidance according to the searched route. The route guidance apparatus or the server searches for the route to the destination using a search link identifier corresponding to the road without considering a specific lane at the time of searching for the route. As an example, if there is a third-lane road that includes left turn, straight ahead and right turn lanes, the route guidance apparatus or the server searches for the route using only the search link identifiers that may arrive from the departure point to the destination without considering the respective lanes at the time of requesting the route search. However, when the route guidance apparatus or the server guides the route after the route is determined, the route guidance apparatus or the server performs the route guidance by considering the respective lanes. As an example, the route guidance apparatus or the server performs the route guidance so that the vehicle uses a straight lane when the vehicle needs to go straight ahead and the vehicle uses the left turn or right turn lane when the vehicle turns left or turns right.

In the present invention, the route calculation to the destination may be performed in navigation mounted in the vehicle, or may be performed in the server and then provided to the navigation or the terminal providing a navigation function.

The road may be constituted by a plurality of lanes and lines for distinguishing each of the plurality of lanes from each other. Additionally, progress direction indication lines, traffic lights, and the like of the road may be formed. Each of the plurality of lanes and each of the plurality of roads may be assigned with a link. Here, the link means an electronically shaped road section connecting a node and a node to each other according to a road line. In the present specification, a link distinguished in units of roads is referred to as a search link, and a link for each lane included in the corresponding search link is referred to as a lane link. Here, the road includes one or more lane, and the search link may be assigned with a search link identifier (ID), which is a unique identifier, to identify a predetermined road section. In addition, each search link identifier may be mapped to a lane link ID for each of the lanes included in each search link. Meanwhile, the node means an electronically shaped point of an intersection, a junction, a tunnel entrance, and the like where a traffic flow is changed. The above-described contents will hereinafter be described in detail with reference to FIGS. 4 to 6.

FIG. 4 is a diagram for performing route guidance for each lane at a four-way intersection according to an exemplary embodiment of the present invention.

S0001 to S0004 430, 435, 440, and 445 correspond to unique search link identifiers assigned to each road section, and are defined as sections between a predetermined start node and a predetermined end node.

The route guidance apparatus or the server performs the route calculation to the destination using the search link identifiers and provides it to the user.

Nodes 400, 405, 410, 415, and 420 shown in FIG. 4 illustrate points at which a change in speed occurs (or a traffic flow is changed) when the vehicle drives on the road, such as intersections, start and end points of a bridge, start and end points of an overpass, start and end points of an underground roadway, start and end points of a tunnel, interchange (IC), and junction (JC), and the node and the node are connected by a link.

Referring to FIG. 4, S001 403 may be assigned as a search link identifier of a section having an n0007 400 corresponding to a point A as a start node and an n0008 405 as an end node. In addition, S0002 435 may be assigned as a search link identifier of a section having the n0008 405 as the start node and an n0009 410 as the end node. In addition, S0003 may be assigned as a search link identifier of a section having the n0008 405 as the start node and an n0010 415, which is a point B, as the end node. In addition, S0004 may be assigned as a search link identifier of a section having the n0008 405 as the start node and an n0011 420 as the end node.

The lane link identifiers corresponding to the respective search link identifiers are matched to the respective search link identifiers, and it may be seen in FIG. 4 that lane link identifiers of I01 430a, I02 430b, and I03 430c are included in the S0001 430, which indicates that a road section corresponding to the S0001 430 is a three-lane road.

According to the exemplary embodiment of the present invention, information on each search link and information on the lane links may be established in the form of a table such as <Table 1> and <Table 2> below.

TABLE 1

| Search Link ID: SID | Start Node | End Node | Rotation Direction Information |
|---|---|---|---|
| S0001 | n0007 | n0008 | Left Turn/Straight Ahead/Right Turn |
| S0002 | n0008 | n0009 | Left Turn/Straight Ahead/Right Turn |
| S0003 | n0008 | n0010 | Left Turn/Straight Ahead |
| S0004 | n0008 | n0011 | Straight Ahead |

Table 1 shows an example of a data structure of the search link according to the exemplary embodiment of the present invention. In Table 1, the search link identifiers (SIDs) have unique values as the search link IDs for identifying the search links, and the start node and the end node represent identification numbers of the node indicating the start node and the end node of the corresponding search link. In addition, the rotation direction information of the search link represents the rotation direction information of the corresponding search link. In Table 1, the rotation direction information of S0001 430 is defined in the order of "left turn", "straight ahead", and "right turn", which corresponds to a clockwise position order of the search links exiting from the node n0008 405 in the intersection according to an exemplary embodiment of the present invention.

TABLE 2

| Search Link ID: SID | Lane Link ID: LID | Progress Direction Information of Lane Link |
|---|---|---|
| S0001 | I01 | Left Turn |
|  | I02 | Straight Ahead |
|  | I03 | Straight Ahead/Right Turn |

Table 2 represents direction information corresponding to lane links identifiers (LIDs) included in the search link according to an exemplary embodiment of the present invention.

In addition, it is assumed in FIG. 4 that the vehicle needs to move from a point A to a point B in order to drive according to a driving route to the destination input by the driver.

When the vehicle needs to progress from the point A to the point B, the route guidance apparatus may know in advance that the vehicle needs to drive on the roads corresponding to S0001 430 and S0003 440 in order for the vehicle to drive from the point A to the point B. In this case, the route guidance apparatus confirms whether there is an intersection within a predetermined distance from the point A 400, confirms the lane link identifier (any one of I01, I02, and I03) on which the vehicle is currently positioned, and confirms S0001 430, which is the search link identifier corresponding to the confirmed lane link identifier. In addition, the route guidance apparatus confirms the end node n0008 of the confirmed S0001 430 and confirms the number n of search links exiting from the confirmed end link n0008 405. In FIG. 4, since S0002 435, which is a straight route, S0003 440, which is a left turn route, and S0004 445, which is a right turn route, exist in the search links exiting from the n0008 405, the number n of search links is 3 in total.

In the case in which the vehicle moves from S0001 430 to S0003 440 according to the driving route as described above, since S0001 403 in Table 1 is the search line in which the left turn, the straight ahead, and the right turn are possible and the total number of search links exiting from the end node n0008 405 is three, the route guidance apparatus according to the exemplary embodiment of the present invention compares sizes of rotation angles in the order of S0003 440, S0002 435, and S0004 445 in the clockwise direction on the basis of S0001 430 to thereby determine the ranking of the search links searched according to the rotation angles.

In FIG. 4, in a case in which the vehicle moves from S0001 430 to S0003 440, since it is determined that the rotation angle between S0001 400 and S0003 440 is 90 degrees, the route guidance apparatus may determine that the direction information of S0003 440 is the left turn, and in a case in which the vehicle moves from S0001 430 to S0002 435, since it is determined that the rotation angle is 180 degrees, the route guidance apparatus may determine that the direction information is the straight ahead.

In addition, in a case in which the vehicle moves from S0001 430 to S0004 445, since it may be determined that the rotation angle between S0001 430 and S0004 445 is 270 degrees, the route guidance apparatus may determine that the moving direction is the right turn. In addition, according to the exemplary embodiment of the present invention, the direction information according to the range of the rotation angle may be determined in advance. As an example, a predetermined range of rotation angles may be determined in advance such as 80 degrees to 100 degrees for left turn, 170 degrees to 190 degrees for straight ahead, and 260 degrees to 280 degrees for right turn, and accordingly, rotation direction information according to the angles between the search links may be determined. Here, the rotation direction information may be information indicating a direction in which the vehicle needs to rotate in order to move from the search link on which the vehicle is currently positioned to a next search link positioned on a driving route. As an example, when the vehicle moves from S0001 430 to S0004 445, the rotation direction information of the search link may be the 'left turn'.

In FIG. 4, the route guidance apparatus confirms that a first positioned search link in the clockwise direction from S0001 430 is S0003 440, a second positioned search link is S0002 435, and a third positioned search link is S0004 445. In addition, since the number of search links from which the vehicle exits is three (n=3) as the intersection to which the vehicle enters is a four-way, the route guidance apparatus searches for only the ranking up to the third search link. Since S0003 440, which is the search link positioned on the driving route is the first positioned search link based on the clockwise direction from S0001 430, the route guidance apparatus may confirm that S0003 440 is a route to make the left turn at the intersection. In addition, the route guidance apparatus may confirm that S0002 435, which is the second positioned search link, is a route to make the straight ahead at S0001 430, and S0004 445, which is the third positioned search link, is a route to make to the right turn.

When the search for the number of search links corresponding to "n" is completed as described above, the route guidance apparatus confirms the rotation direction information (left turn) corresponding to the search link positioned on the driving route among the searched search links, and confirms a moving direction information of the lane link identifier (LID) on which the vehicle is currently positioned. According to Table 2, in FIG. 4, since the moving direction information on I01 430a is the left turn, the moving direction information on I02 430b is the straight ahead, and the moving direction information on I03 430c is the right turn, the route guidance apparatus confirms whether or not moving direction information on a current driving lane coincides with moving direction information on S0003 440, which is the searched first search link.

If the vehicle is positioned on I01 430a, the route guidance apparatus does not perform separate lane change guidance because the moving direction information on I01 430a is the left turn and the rotation direction information for moving from S0001 430 to S0003 440 is also the left turn. However, if the vehicle is positioned on I02 430b or I03 430c, the route guidance apparatus displays a lane change guidance message for guiding the change of the current driving lane to a lane corresponding to I01 430a to the user, or transmits the lane change guidance message to the control unit of the vehicle to thereby control to operate a steering wheel so that the vehicle may perform the lane change.

That is, according to the present invention, when it is necessary to change the direction of the vehicle before entering the intersection, it is possible to perform the route guidance in units of lanes depending on whether or not the vehicle is positioned on the lane in which the direction change is possible. As an example, if the vehicle needs to make the left turn, the vehicle needs to be positioned on a left turn lane before making the left turn. However, if the vehicle needs to make the left turn, but is currently positioned on a straight or right turn lane, the route guidance apparatus needs to guide the driver to change the lane to the left turn lane. Alternatively, if the vehicle is an autonomous vehicle, it is necessary to transmit a control message for changing the lane to the control unit responsible for autonomous driving of the vehicle.

In addition, if the vehicle needs to perform the lane change to safely enter the intersection, the moving direction information on the lane on which the vehicle is moving needs to coincide with rotation direction information between the search link in which the vehicle is currently positioned and a next search link. To this end, according to the present invention, the rotation direction information of the search link defined according to the order of positions according to the rotation directions of the search links exiting from the intersection is used. That is, it is determined whether or not the direction of the vehicle may be safely changed by comparing the rotation direction information according to the rotation direction order between the search links on the driving direction and the moving direction information of the current driving lane, and if the lane on which the vehicle is moving is positioned on a lane in which the vehicle may not change the direction at the intersection, the route guidance apparatus guides the driver to change the lane in advance to a lane capable of safely changing the direction of the vehicle.

Referring again to FIG. 4, in a case in which the vehicle moves from S0001 430 to S0004 445, since S0001 430 is the search link in which the left turn, the straight ahead, and the right turn are possible according to Table 1, the sizes of the rotation angles from S0001 430 to S0003 440, S0002 435, and S0004 445 are compared. That is, the rotation angle from S0001 430 to S0003 440 is the smallest, and the rotation angle increases in the order of the rotation angle from S0001 430 to S0002 435, and the rotation angle from S0001 430 to S0004 445.

Therefore, in a case in which the vehicle moves from S0001 430 to S0003 440, the route guidance apparatus may determine the left turn, in a case in which the vehicle moves from S0001 430 to S0002 435, the route guidance apparatus may determine the straight ahead, and in a case in which the vehicle moves from S0001 430 to S0004 445, the route guidance apparatus may determine the right turn.

In addition, in FIG. 4, since the vehicle needs to drive from the Point A to the Point B, the driver is guided to make the left turn because the vehicle needs to move from S0001 430 to S0003 440. If the vehicle is an autonomous vehicle, the control unit of the vehicle other than the driver controls a steering wheel, a throttle valve, a brake pedal, an electric motor, and the like, which are the respective parts related to the driving of the vehicle for making the left turn.

Further, although FIG. 4 describes that the route guidance apparatus searches for the search links on the driving route in the clockwise direction from the search link on which the vehicle is currently positioned, this is merely an example of the present invention and the route guidance apparatus may also search for the search links on the driving route in a counterclockwise direction.

A method for performing route guidance by the route guidance apparatus according to the situation of FIG. 4 described above will be described as follows.

First, the route guidance apparatus confirms a lane link identifier (any one link of I01 to I03) corresponding to the lane on which the vehicle is positioned, and confirms the search link S0001 430 corresponding to the confirmed lane link identifier. In addition, the route guidance apparatus confirms the order in which S0003 440, which is the search link positioned on the driving route among S0003 440, S0002 435, and S0004 445, which are the search links exiting from n0008 405, which is the end node of the confirmed search link (S0001 430), is positioned in the clockwise direction from the search link S0001 430 on which the vehicle is currently positioned. Alternatively, the route guidance apparatus confirms the order in which S0003 440 is positioned in the counterclockwise direction from the search link S0001 430 on which the vehicle is currently positioned.

The route guidance apparatus confirms that the search link S0003 440 is positioned in the first order in the clockwise direction from the search link S0001 430, and accordingly, it may be confirmed that the rotation direction information of S0003 440 is "left turn", which is first information of the rotation direction information of Table 1. In addition, the route guidance apparatus confirms whether the moving direction information of the lane link identifier on which the vehicle is positioned is the "left turn", and confirms whether the moving direction information coincides with the "left turn", which is the determined rotation direction information of S0003 440. In addition, the route guidance apparatus confirms whether "left turn", which the determined rotation direction information of S0003 440 and the moving direction information of the lane link identifier corresponding to the lane on which the vehicle is currently positioned are "left turn".

If the confirmed rotation direction information of the search link S0003 440 and the confirmed moving direction information of the lane link identifier (LID) coincide with each other, the route guidance apparatus guides the vehicle to drive on the corresponding lane link, and if the confirmed rotation direction information of the search link S0003 440 and the confirmed moving direction information of the lane link identifier (LID) does not coincide with each other, the route guidance apparatus guides the driver to change to a lane having the moving direction information corresponding to the rotation direction information of the search link S0003 440.

That is, the route guidance apparatus confirms the number of remaining search links excluding the search link corresponding to the lane on which the vehicle is currently moving among the search link identifiers (SIDs) of the roads on the intersection at which the vehicle enters, and rotation directions of the search links on which the vehicle may move according to the position order of the search links. The route guidance apparatus guides the driver to drive on a lane corresponding to the lane link identifier (LID) coinciding with the moving direction information corresponding to the rotation direction of the search link existing on the driving route among the confirmed rotation directions of the search links.

FIG. 5 is a diagram for performing route guidance for each lane at a three-way intersection according to an exemplary embodiment of the present invention.

In FIG. 5, a description is made by assuming a situation in which the vehicle needs to drive from a point A to a point B.

S0001 550, S0002 560, and S0003 570 are search link identifiers (SIDs) existing on the three-way intersection, and n0005 500, n0006 505, n0007 510, and n0008 520 indicate nodes for indicating start and end positions of the search links. In addition, I01 550a, I02 550b, and I03 550c indicate the lane link identifiers (LIDs) corresponding to lanes included in S0001 550, I05 560a, I06 560b, and I07 560c indicate the lane link identifiers (LIDs) corresponding to the lanes included in S0002 560, and I21 570a and I22 570b indicate the lane link identifiers (LIDs) corresponding to the lanes included in S0003 570.

The relationship between the search links and the lane links shown in FIG. 5 is shown as in Tables 3 and 4 below.

TABLE 3

| Search Link ID (SID) | Start Node | End Node | Rotation Direction Information |
|---|---|---|---|
| S0001 | n0005 | n0006 | Straight Ahead/Straight Ahead and Right Turn |
| S0002 | n0006 | n0007 | Left Turn/Straight Ahead |
| S0003 | n0006 | n0008 | Straight Ahead/Right Turn |

Table 3 shows an example of a data structure of the search links for the three-way intersection shown in FIG. 5. In Table 3, the search link identifiers (SIDs) have unique values as the search link identifiers for identifying the search links, and the start node and the end node represent identification numbers of the node indicating the start node and the end node of the corresponding search link. In addition, the rotation direction information of the search link represents the rotation direction information of the corresponding search link. In Table 3, the rotation direction information of S0001 550 is defined in the order of "straight ahead", "straight ahead and right turn", which corresponds to a clockwise position order of the search links existing from the node n0006 505 in the intersection according to an exemplary embodiment of the present invention.

TABLE 4

| Search Link ID: SID | Lane Link ID: LID | Moving Direction Information of Lane Link |
|---|---|---|
| S0001 | I01 | Straight Ahead |
|  | I02 | Straight Ahead |
|  | I03 | Straight Ahead and Right Turn |

Table 4 shows a data structure of moving direction information of the lane link identifiers (LIDs) corresponding to S0001 550.

In FIG. 5, in a case in which the route guidance apparatus needs to drive from a point A to a point B according to a calculated driving route, the route guidance apparatus needs to drive from n0005 500 to n0008 520, and the search links existing between the nodes are S0001 550 and S0003 570. In addition, since the total number of search links exiting from n0006 505, which is the end node of S0001 550 is two, it is determined that n is 2 and accordingly, it is determined that the corresponding intersection is the three-way intersection.

The route guidance apparatus confirms that the intersection exists within a predetermined distance from a current position, and performs lane change guidance for direction change at the search link corresponding to S0001 550 on which the vehicle is currently positioned.

In FIG. 5, the route guidance apparatus obtains a position of the vehicle and confirms a lane link identifier (LID) coinciding with the obtained position information of the vehicle. In addition, the route guidance apparatus calculates direction angles 580 and 585, respectively, between n0006 505, which is the end node of S0001 550 and S0002 560 and S0003 570, which are the search link identifiers (SIDs) exiting from n0006 505. The rotation direction information of the search links confirmed in Table 3 is determined in an ascending order of the calculated direction angles.

That is, since S0002 560 is positioned at 180 degrees (580) in the clockwise direction from n0006 505 and S0003 570 is positioned at 250 degrees (585) in the clockwise direction from n0006 505, S0002 560 is positioned at the first position from n0006 505. Therefore, the route guidance apparatus may confirm that the direction information of S0002 560 is a straight ahead direction, which is first information of the direction information of S0001 550 defined in Table 3, and confirm that the rotation direction information of S0003 570 positioned at a second position is "straight ahead and right turn direction", which is second information of the rotation direction information of S0001 550 defined in Table 3. Meanwhile, unlike the above example, the route guidance apparatus may also calculate direction angles 580 and 585, respectively, between S0001 500, which is the search link on which the vehicle is currently positioned and S0002 560 and S0003 570, which are the search link identifiers (SIDs) exiting from n0006 505.

Meanwhile, if the rotation direction information of the search links positioned on the driving route is confirmed in Table 3 according to the order positioned in the clockwise direction from the end node n0006 505, the route guidance apparatus compares the moving direction information corresponding to the lane link identifier (LID) existing on the search link S0001 550 on which the vehicle is currently positioned, defined in Table 4 with the rotation direction information of S0003 570, which is the search link positioned on the driving route.

In a case in which the vehicle is positioned on I01 550a or I02 550b, since "straight ahead", which is the moving direction information of I01 550a or I02 550b and "right turn", which is the rotation direction information of S0003 570, do not coincide with each other, the route guidance apparatus guides the driver to change the lane to I03 550c having direction information (straight ahead and right turn) including "right turn", which is the rotation direction information of S0003 570.

FIG. 6 is a diagram for performing route guidance for each lane at a five-way intersection according to an exemplary embodiment of the present invention.

In FIG. 6, a description is made by assuming a situation in which the vehicle needs to drive from a point A to a point B.

S0001 650, S0002 655, S0003 660, S0004 665, and S0005 670 are search link identifiers (SIDs) existing on the five-way intersection, and n0006 600, n0007 605, n0008 610, n0009 615, n0010 620, and n0011 625 indicate nodes for indicating start and end positions of the search links. In addition, I01 600a, I02 600b, I03 600c, I04 600d, I05 600e, and I06 600f indicate lane link identifiers (LIDs) corresponding to lanes included in S0001 650.

The relationship between the search links and the lane links shown in FIG. 6 is shown as in Tables 5 and 6 below.

TABLE 5

| Search Link ID: SID | Start Node | End Node | Rotation Direction Information |
|---|---|---|---|
| S0001 | n0006 | n0007 | Left Turn and U-Turn/Left Turn/Straight Ahead/Right Turn |
| S0002 | n0007 | n0008 | Left Turn and U-Turn/Straight Ahead/Straight Ahead and Right Turn |
| S0003 | n0007 | n0009 | Left Turn/Straight Ahead/Right Turn |
| S0004 | n0007 | n0010 | Straight Ahead |
| S0005 | n0007 | n0011 | Left Turn/Straight Ahead/Right Turn |

Table 5 shows an example of a data structure of the search links for the five-way intersection shown in FIG. 6. In Table 5, the search link identifiers have unique values as the search link IDs for identifying the search links, and the start node and the end node represent identification numbers of the node indicating the start node and the end node of the corresponding search link. In addition, the rotation direction information of the search link represents the rotation direction information of the corresponding search link. In Table 5, the rotation direction information of S0001 650 is defined in the order of "left turn and u-turn", "left turn", "straight ahead", and "right turn", which corresponds to a clockwise position order of the search links advancing from the node n0007 605 in the intersection according to an exemplary embodiment of the present invention.

Therefore, according to the exemplary embodiment of the present invention, since the order of the search links S0002 to S0005 exiting from the node n0007 607, which are positioned in the clockwise direction (or counterclockwise direction) from n0007 605 coincides with the rotation direction information defined in S0001 660, the rotation direction information of S0003 660 positioned at a second position in the clockwise direction corresponds to "left turn", which is a second value of a rotation direction information field of S0001 defined in Table 5, and the rotation direction information of S0005 670 positioned at a first position in the clockwise direction corresponds to "left turn and u-turn", which is a first value of the rotation direction information field of S0001 defined in Table 5. In addition, it may be confirmed that the rotation direction information of S0002 655 positioned at a third position corresponds to "straight ahead", which is a third value of the rotation direction information field of S0001 defined in Table 5, and the rotation direction information of S0004 665 positioned at a fourth position corresponds to "right turn", which is a fourth value of the rotation direction information field of S0001 defined in Table 5.

As described above, according to the present invention, it is possible to confirm the order of the rotation direction information defined for each search link using the position order of the search links exiting from the end node of each search link in the clockwise direction or the counterclockwise direction.

TABLE 6

| Search Link ID: SID | Lane Link ID: LID | Moving Direction Information |
|---|---|---|
| S0001 | I01 | Left Turn and U-Turn |
|  | I02 | Left Turn |
|  | I03 | Straight Ahead |
|  | I04 | Straight Ahead |
|  | I05 | Straight Ahead |
|  | I06 | Right Turn |

Table 6 shows a data structure of moving direction information of the lane link identifiers (LIDs) included in S0001 650.

In FIG. 6, in a case in which the route guidance apparatus needs to drive from a point A to a point B according to a calculated driving route, the route guidance apparatus needs to drive from n0006 600 to n0009 615, and determines that the search links existing between the nodes are S0001 650 and S0003 660. In addition, since the total number of search links exiting from n0007 605, which is the end node of S0001 650 is four, it is determined that n is 4 and accordingly, it is determined that the corresponding intersection is the five-way intersection.

The route guidance apparatus confirms that the intersection exists within a predetermined distance from a current position, and performs lane change guidance for direction change at the search link corresponding to S0001 650 on which the vehicle is currently positioned.

In FIG. 6, the route guidance apparatus obtains a position of the vehicle, confirms an LID (any one of I01 600a to I06 600f) coinciding with the obtained position information of the vehicle, and confirms S0001 650, which is the search link identifier including the confirmed LID. In addition, the route guidance apparatus calculates direction angles 675, 680, 685, and 690, respectively, between n0007 605 and S0002 655, S0003 660, S0004 665, and S0005 670, which are the search link identifiers (SIDs) exiting from n0007 605. The rotation direction information of the search links confirmed in Table 5 is determined in an ascending order of the calculated direction angles.

That is, since S0005 670 is positioned at 30 degrees (675) in the clockwise direction from n0007 605 and S0003 660 is positioned at 80 degrees (680) in the clockwise direction from n0007 605, S0005 670 is positioned at a first position in the clockwise direction from n0007 605 and S0003 660 is positioned at a second position in the clockwise direction from n0007 605. In a case in which the positions of the remaining search link identifiers (SIDs) are also determined in the clockwise direction in the same manner, since S0002 655 is positioned at 185 degrees (685) in the clockwise direction from n0007 605 and S0004 665 is positioned at 260 degrees (690) in the clockwise direction from n0007 605, S0002 655 is positioned at a third position in the clockwise direction from n0007 605 and S0004 is positioned at a fourth position in the clockwise direction from n0007 605.

As described above, in FIG. 6, since the angles in the clockwise direction from n0007 605 are calculated for S0002 655 to S0005 670 exiting from n0007 605, the rotation direction information on each of the search links may be determined.

That is, since S0005 670 is positioned at the first positioned while forming an angle of 30 degrees in the clockwise direction from n0007 605, the route guidance apparatus confirms that the rotation direction information for driving to S0005 670 corresponds to "left turn and u-turn", which is the first information of the rotation direction information of S0001 650 defined in Table 1, and confirms the moving direction information of the lane link (LID) on which the vehicle is currently driving among I01 600a to I06 600f, which are the lane links included in S0001 650. For example, if the vehicle needs to drive from n0007 605 to S0003 660, the route guidance apparatus confirms whether or not the vehicle drives on the lane corresponding to the lane link having the moving direction information coinciding with the confirmed rotation direction information of S0003 660, and if the vehicle is driving on a lane that does not coincide with the rotation direction information of S0003 660, the route guidance apparatus guides the driver to drive on the lane corresponding to the moving direction information coinciding with the rotation direction information of the search link.

If the vehicle is currently driving on I01 600a, the moving direction information of I01 600a in Table 6 is "left turn and u-turn", which does not coincide with "left turn", which is the rotation direction information of S0001 650 defined in Table 5 corresponding to the position order of S0003 660, and therefore, the route guidance apparatus may determine that the driving lane needs to be changed. However, if the vehicle is driving on I02 600b, the moving direction information of I02 600b in Table 6 is "left turn", from which it may be seen that the moving direction information of I02 600b coincides with the rotation direction information corresponding to S0003 660, and the route guidance apparatus does not perform separate lane change guidance.

However, according to another exemplary embodiment of the present invention, in a case in which the number of moving direction information of a current driving lane is plural and one of a plurality of moving direction information is included in the rotation direction information of the search link identifier (SID) on the driving route exiting from the intersection, the route guidance apparatus may also not perform the separate lane change guidance. For example, in a case in which the rotation direction information of the search link identifier (SID) is "left turn and u-turn" and the moving direction information of the current driving lane is "left turn", the route guidance apparatus may not perform the separate lane change guidance.

If the vehicle needs to move from n0007 605 to n0008 610, the route guidance apparatus confirms the position order of S0002 655 and confirms that S0002 655 is positioned at the third position in the clockwise direction. As a result, in order for the vehicle to exit from S0001 650 to S0002 655, the route guidance apparatus confirms whether the vehicle is driving on the lane of a "straight ahead" direction, which is the third information of the rotation direction information of S0001 650 defined in Table 5, and guides the lane change when the vehicle is not positioned on the lane of the straight ahead direction. In this case, the route guidance apparatus confirms whether the vehicle is driving on I03 600c, I04 600d, and I05 600e having information on the "straight ahead" direction as defined in Table 6.

As another approach, since S0005 670 is positioned at a first position while forming an angle of 30 degrees (675) in the clockwise direction from n0007 605, it may be confirmed that S0005 670 is rotation direction information (left turn 1) corresponding to the leftmost of left turn routes exiting from n0007 605, and since S0003 660 is positioned at a second position while forming an angle of 80 degrees (680) in the clockwise direction from n0007 605, it may be confirmed that S0003 660 is rotation direction information (left turn 2) corresponding to a second left turn route from the leftmost of the left turn routes exiting from n0007 605. In the same method, since S0002 655 is positioned at a third position while forming an angle of 185 degrees (685) in the clockwise direction from n0007 605, it may be confirmed that S0002 655 is rotation direction information (straight ahead) corresponding to a straight ahead route exiting from n0007 605, and since S0004 665 is positioned at a fourth position while forming an angle of 260 degrees (690) in the clockwise direction from n0007 605, it may be confirmed that S0004 665 is rotation direction information (right turn) corresponding to an only right turn route exiting from n0007 605.

According to the exemplary embodiment of the present invention, it is possible to detect the rotation direction information according to the position order of the routes exiting from the end node and the angles of the routes exiting from the end node. For example, if the angle between the end node and the route exiting from the end node is between 0 and 170 degrees, the left turn may be determined, if the angle between the end node and the route exiting from the end node is positioned between 170 and 190 degrees, the straight ahead may be determined, and if the angle between the end node and the route exiting from the end node is positioned between 190 and 355 degrees, the right turn may be determined.

Therefore, the route guidance apparatus may confirm that the rotation direction information of S0003 660 is the left turn information, which is the second information of the rotation direction information of S0001 650 defined in Table 5. For example, it may be confirmed that the rotation direction information of S0005 670 is left turn and u-turn direction information, which is the first information of the rotation direction information of S0001 650 defined in Table 5, and the rotation direction information of S0002 655 is straight ahead, which is the third information of the rotation direction information of S0001 650 defined in Table 5.

Also in the exemplary embodiment of FIG. 6, if the confirmed rotation direction information of the search link identifier (SID) on the driving route and the moving direction information of the lane link identifier on which the vehicle is currently driving do not coincide with each other, the route guidance apparatus may guide the driver to change the lane to a lane having a moving direction coinciding with the rotation direction information of the search link identifier (SID).

Alternatively, if the confirmed rotation direction information of the search link identifier (SID) on the driving route includes the moving direction information of the lane link identifier on which the vehicle is currently driving, the route guidance apparatus according to another exemplary embodiment of the present invention may not perform the lane change guidance. Referring to FIG. 6, the reason is that it is possible for the vehicle to safely exit in a case in which the vehicle is driving on a lane that the moving direction information is the left turn among the lanes of S0001 650, when the vehicle exits from n0007 605 to S0003 660 or S0005 670.

Figure 7:
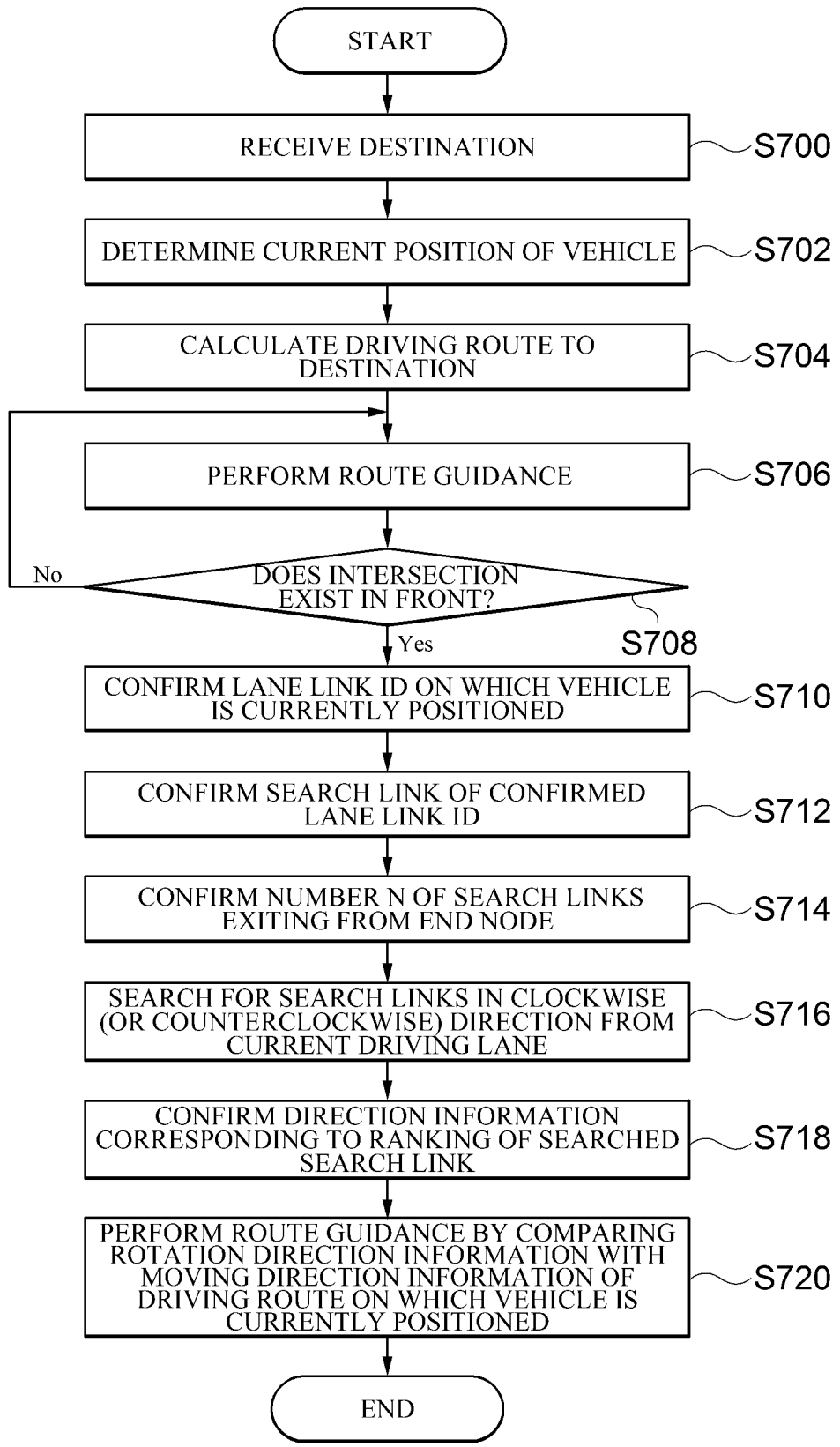
FIGS. 7 to 9 are flowcharts of the route guidance method according to an exemplary embodiment of the present invention.

FIG. 7 is a flowchart of the route guidance method according to an exemplary embodiment of the present invention.

In S700, if the route guidance apparatus receives a destination from the user, the route guidance apparatus determines a current position of the vehicle in S702, calculates a driving route to the destination in S704, and performs route guidance with the calculated route in S706.

If an intersection exists in front within a predetermined distance from a current point in S708, the route guidance apparatus confirms a lane link identifier (LID) on which the vehicle is currently positioned in S710 and confirms a search link identifier (SID) corresponding to the confirmed lane link identifier in S712. On the other hand, as a result of a check in S708, if the intersection does not exist in front, the route guidance apparatus continues to perform the route guidance in S706.

If the search link identifier is confirmed in S712, the route guidance apparatus confirms the number n of search links exiting from an end node of the confirmed search link identifier in S714. For example, in the case of a four-way intersection, since the number of search links exiting from the end node is 3, n is 3.

In addition, the route guidance apparatus searches for a search link to be driven later in a clockwise direction (or counterclockwise direction) from the search link corresponding to the current driving lane in S716, and confirms rotation direction information corresponding to a ranking the searched search link in S718.

Finally, the route guidance apparatus performs the route guidance by comparing the rotation direction information corresponding to the ranking of the search link searched in S718 with moving direction information of the lane link identifier of the driving lane on which the vehicle is currently positioned in S720. The route guidance apparatus may also search for the search link in a counterclockwise direction in S716.

Although FIG. 7 illustrates that a main body of the operation is the route guidance apparatus, a server may perform the operations S702 to S720 when the route guidance apparatus having a communication function transmits the destination received from the user to the server which is connected to the route guidance apparatus via communication. In this case, the server measures and determines the position of the vehicle via communication with the route guidance apparatus installed in the vehicle in S702. That is, when the route calculation procedure according to the exemplary embodiment of the present invention is performed in the server, the lane change guidance message for entering the intersection positioned within the predetermined distance from the current driving lane may be generated by the server and may also be provided to the route guidance apparatus via communication.

Figure 8:
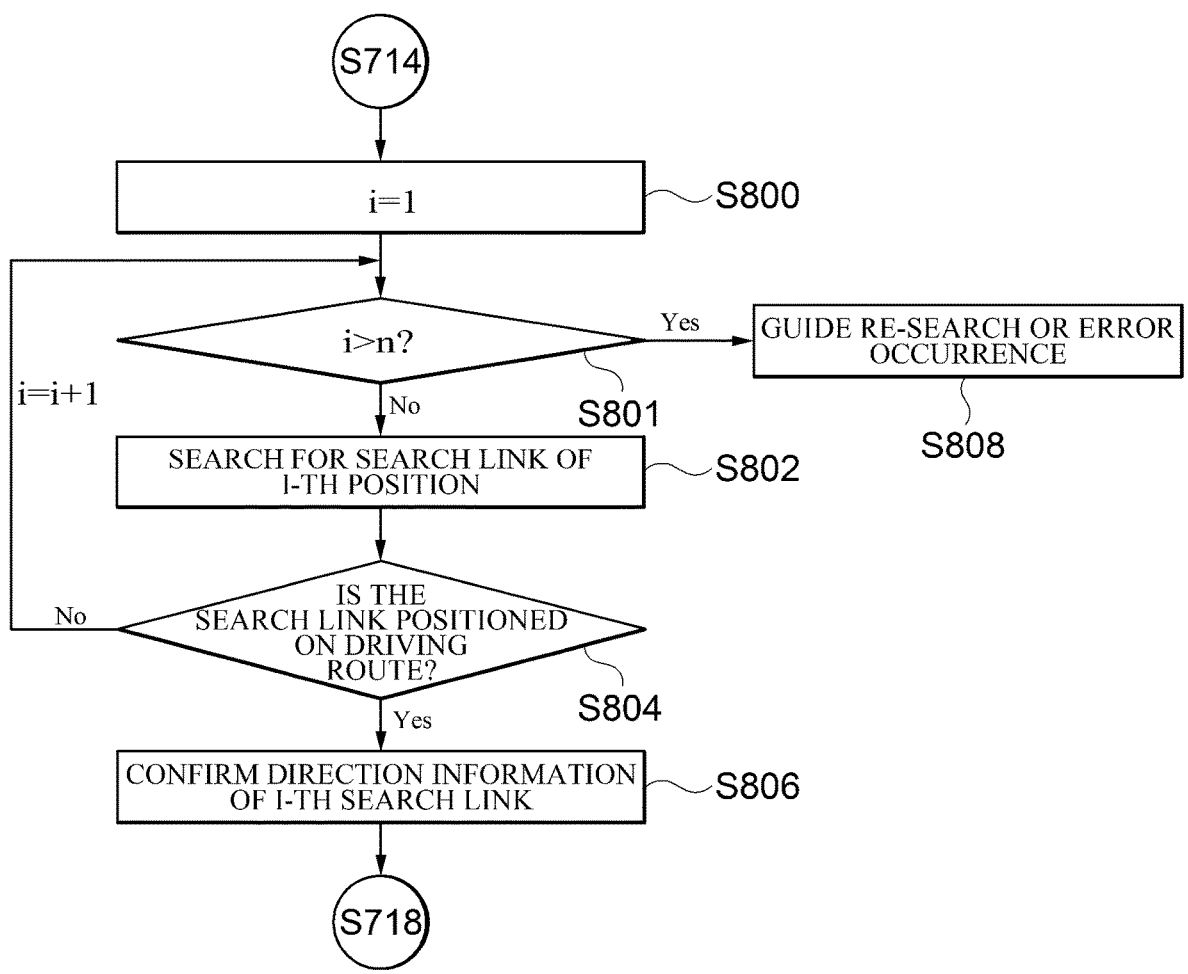

FIG. 8 is a flowchart of a detailed method of S716 of FIG. 7.

If the maximum number n of search links is confirmed in S714 of FIG. 7, the route guidance apparatus sets a variable i for counting the number of searched search links to 1 in S800. In addition, the route guidance apparatus checks whether i is greater than the maximum number n of search links in S801, and as the check result of S801, if i is smaller than n, the route guidance apparatus determines that the search link to be searched remains, and searches for a search link positioned at an i-th position in S802. On the other hand, if i is greater than n in S801, the route guidance apparatus displays a re-search or error occurrence message in S808. In addition, the route guidance apparatus confirms whether the search link searched in S802 is the search link positioned on the driving route calculated in S704 of FIG. 7 in S804.

As a result of the confirmation of S804, if the searched search link is the search link positioned on the driving route, the route guidance apparatus proceeds to S806 to confirm rotation direction information of the i-th search link. On the other hand, as the result of the confirmation, if the searched search link is not the search link positioned on the driving route, the route guidance apparatus performs i+1 to check a search link positioned at a next position and proceeds to S801.

Figure 9:
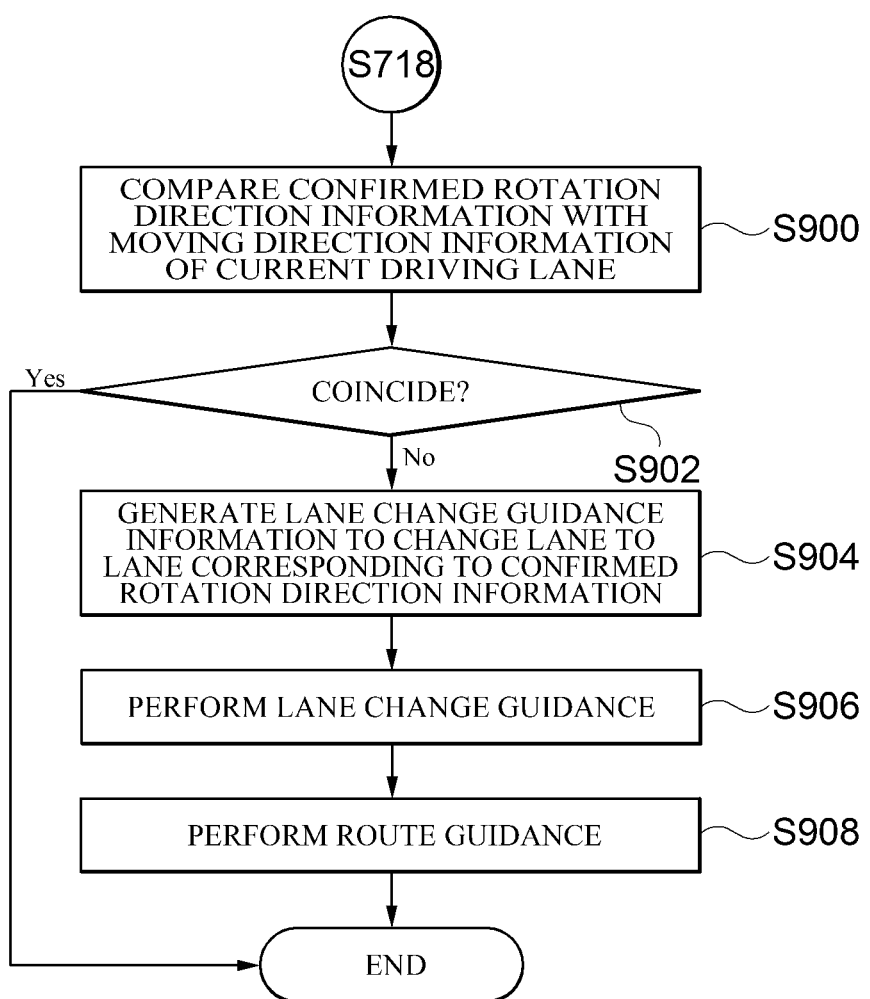

FIG. 9 is a flowchart of a detailed method of S720 of FIG. 7.

In S900, the rotation direction information confirmed in S718 and the moving direction information of the lane link identifier (LID) corresponding to the current driving lane are compared with each other, and if the rotation direction information and the moving direction information coincide with each other ("Yes" in S902), the route guidance apparatus does not perform the lane change guidance and continues to perform the existing route guidance.

However, in S900, if the rotation direction information confirmed in S718 and the moving direction information corresponding to the current driving lane does not coincide with each other ("No" in S902), the route guidance apparatus proceeds to S904.

The route guidance apparatus generates lane change guidance information for guiding a change to a lane having the moving direction information corresponding to the rotation direction information confirmed in S718 in S904, performs the lane change guidance by using the generated lane change guidance information in S906, and performs the route guidance until the vehicle reaches the destination in S908.

In S902, it is only described that the confirmed rotation direction information of the search link and the moving direction information of the driving lane coincide with each other according to an exemplary embodiment of the present invention, but S902 may also be replaced with an operation in which the confirmed rotation direction information of the search link includes the moving direction information of the driving lane according to another exemplary embodiment of the present invention.

Figure 10:
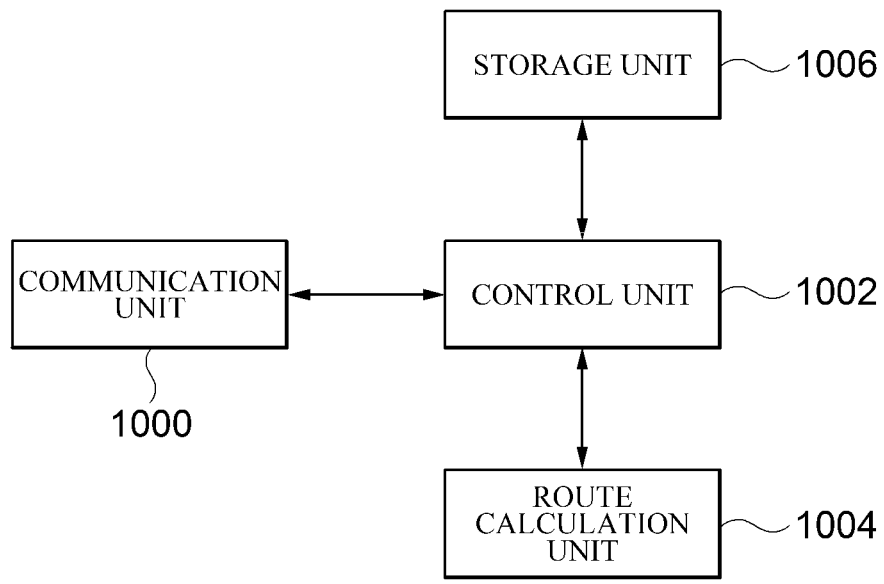
FIG. 10 is a diagram illustrating a configuration of a server according to an exemplary embodiment of the present invention.

FIG. 10 is a block diagram of the server according to an exemplary embodiment of the present invention.

In FIG. 10, a communication unit 1000 transmits and receives data to and from the route guidance apparatus via wireless communication with the route guidance apparatus including a navigation device mounted in the vehicle or a terminal having a communication function such as a smart phone of the user boarding the vehicle. Specifically, if the communication unit 1000 receives departure point information and destination information from the route guidance apparatus, the communication unit 1000 provides a driving route to the destination calculated by a route calculation unit 1004 to the route guidance apparatus.

A storage unit 1006 stores digital map data for performing route guidance, and information on a search link identifier (SID) and a lane link identifier (LID) included in the map data.

A control unit 1002 controls a general operation of the server, and if the control unit 1002 receives a route guidance providing request message, a departure point, a destination, information on a current position of the vehicle, and the like from the route guidance apparatus of the vehicle or the driver via the communication unit 1000, the control unit 1002 controls the route calculation unit 1004 to calculate a driving route from the current position of the vehicle to the destination. In addition, the control unit 1002 transmits the driving route calculated by the route calculation unit 1004 to the route guidance apparatus via the communication unit 1000.

The route calculation unit 1004 calculates the driving routes to the destination requested from the route guidance apparatus by the control of the control unit 1002, and if the intersection exists on the driving route as described above in FIGS. 7 to 9, the route calculation unit 1004 performs an operation of causing the vehicle to easily perform the lane change before the vehicle enters the intersection by comparing the moving direction information of the current driving lane with the rotation direction information of the search links exiting from the end node of the current driving lane. Specifically, the route calculation unit 1004 confirms the lane link identifier (LID) on which the vehicle is currently positioned, confirms the search link of the confirmed lane link identifier, confirms the number n of search links exiting from the end node of the lane link identifier on which the vehicle is currently positioned, and searches for the search links in the clockwise direction or the counterclockwise direction from the current driving lane. In addition, the route calculation unit 1004 confirms the rotation direction information corresponding to a ranking of the searched search link, and compares the confirmed rotation direction information with the moving direction information of the driving lane on which the vehicle is currently positioned to thereby perform the route guidance.

In other words, the operations in FIGS. 7 to 9 may also be performed by the route calculation unit 1004 of the server other than the route guidance apparatus.

Figure 11:
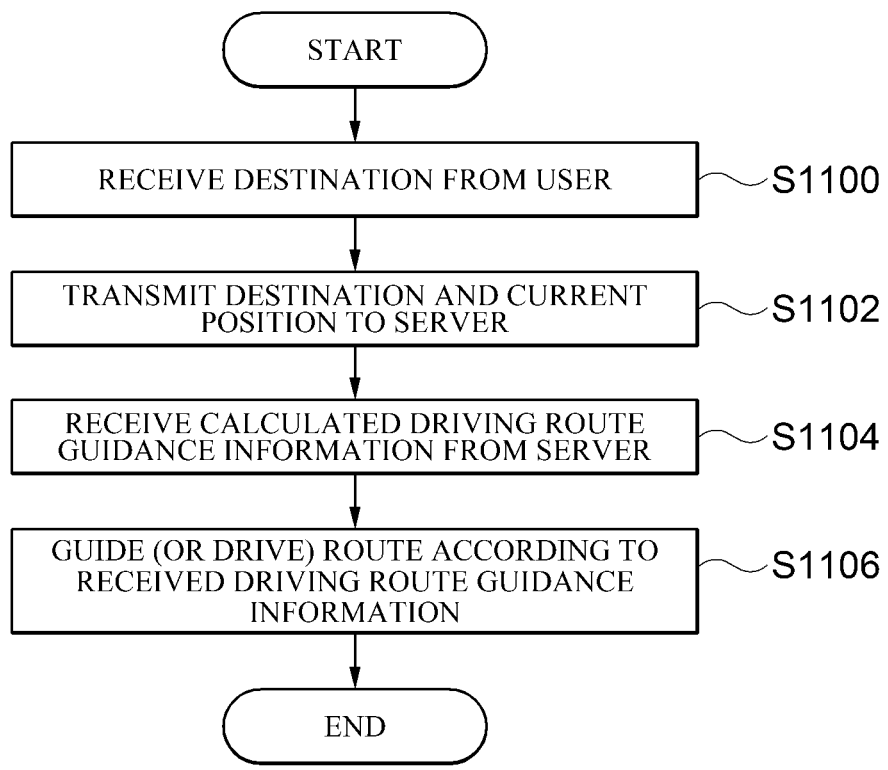
FIGS. 11 and 12 are flowcharts of a route guidance method of a route guidance apparatus according to an exemplary embodiment of the present invention.

FIG. 11 is a flowchart of a route guidance method of a route guidance apparatus according to an exemplary embodiment of the present invention.

If the route guidance apparatus receives the destination from the user in S1100, the route guidance apparatus transmits the received destination and a current position to the server in S1102. In addition, in S1104, the route guidance apparatus receives from the server, guidance information on the driving route calculated from the current position to the destination. In this case, the guidance information received from the server in S1104 includes information on search links positioned next to the search link which is currently positioned on the calculated driving route, and lane links included in the search link, and includes information indicating a search link and a lane link on which the vehicle is to drive along the calculated route.

In S1106, the route guidance apparatus may perform the route guidance for the user by using the driving route guidance information received from the server in S1104, or allow the vehicle to drive along the driving route by transmitting the driving route guidance information to the control unit.

The route guidance method according to FIG. 11 may also be performed by a navigation mounted in the vehicle, and may also be performed through the smart phone that performs wireless communication with the server.

Figure 12:
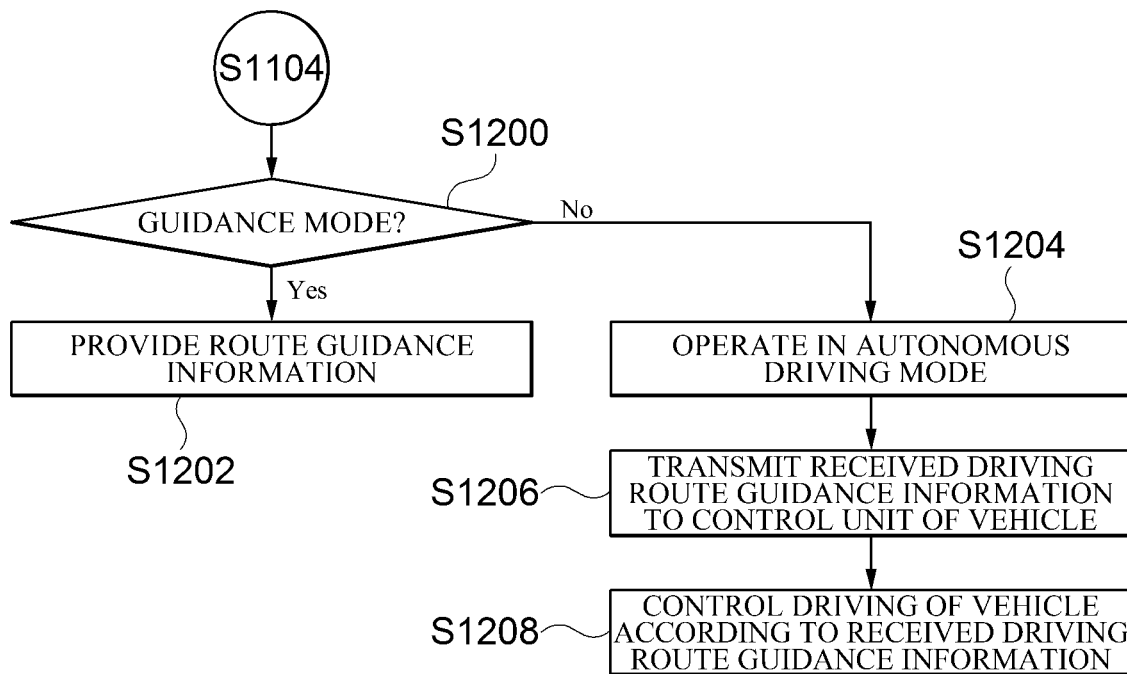

FIG. 12 illustrates a case in which the embodiment of the present invention is applied to an autonomous vehicle.

The route guidance apparatus that receives the calculated driving route guidance information from the server in S1104 of FIG. 11 checks whether a current mode is a route guidance mode in S1200, and if the current mode is the route guidance mode in S1200, the route guidance apparatus provides the route guidance information in S1202.

On the other hand, if the current mode is not the guidance mode in S1200, the route guidance apparatus determines that the current mode is an autonomous driving mode, operates in the autonomous driving mode in S1204, and transmits the driving route guidance information received in S1104 to the control unit of the vehicle in S1206.

In S1208, the control unit of the vehicle controls an operation of the vehicle according to the received driving route guidance information. As an example, the control unit of the vehicle may control a steering wheel, a throttle valve, a brake pedal, an electric motor, and the like so that the vehicle may change the lane.

Figure 13:
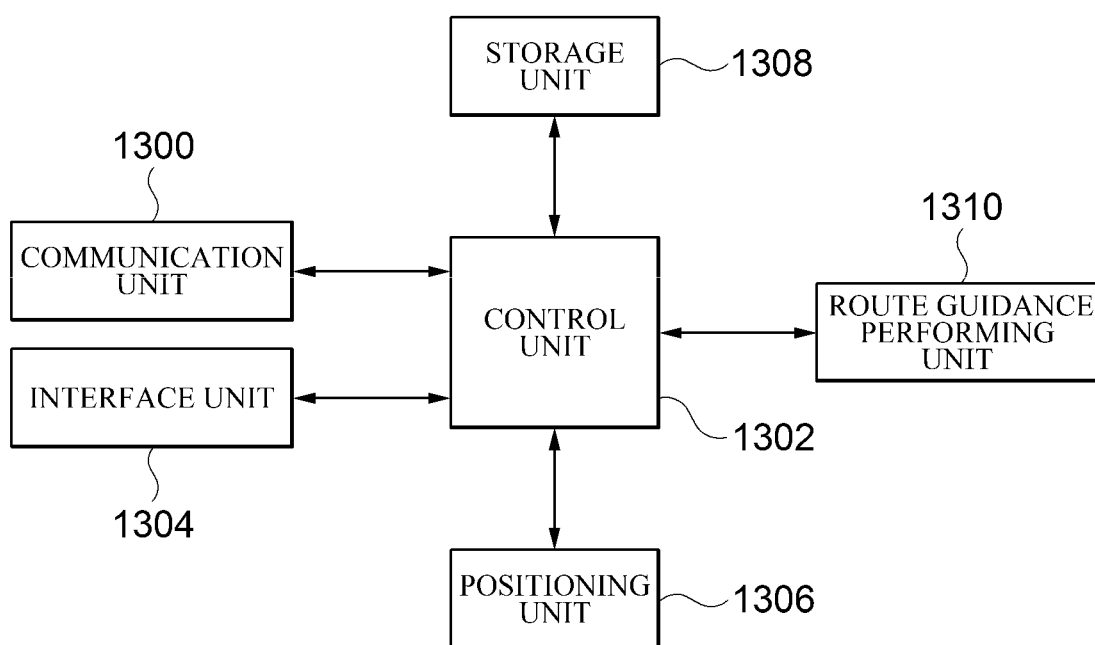
FIG. 13 is a diagram illustrating a configuration of a route guidance apparatus according to an exemplary embodiment of the present invention.

FIG. 13 is a block diagram of a route guidance apparatus according to an exemplary embodiment of the present invention.

A communication unit 1300 performs data transmission and reception with the server via a mobile communication network, a wireless communication network, or the like, and an interface unit 1304 is connected to a control unit (not shown) of the vehicle that controls the overall operation of electrical, electronic, and mechanical parts of the vehicle to transmit and receive various control information and data.

A positioning unit 1306 measures a current position via GPS or GNSS, and generates position information, and a storage unit 1308 stores various programs for providing a route guidance service, various program codes for operation of the route guidance apparatus, route guidance information transmitted from the server via the communication unit 1300, and the like.

A route guidance performing unit 1310 performs the route guidance to the destination, may also perform the route guidance using information of route guidance received from the server, and may also perform the route guidance using route guidance information calculated through a self route guidance program without communicating with the server.

If a control unit 1302 receives the destination and a route guidance request through an input unit (not shown) from the user, the control unit 1302 transmits the current position positioned by the positioning unit 1306 and information on the destination input by the user to the server through the communication unit 1300, and if the control unit 1302 receives information on the driving route calculated from the current position to the destination from the server through the communication unit 1300, the control unit 1302 controls the route guidance performing unit 1310 to perform the route guidance using the received information on the driving route. On the other hand, the control unit 1302 may control the route guidance performing unit 1310 to perform the route guidance from the current position measured by the positioning unit 1306 to the destination without performing the communication with the server through the communication unit 1300.

In addition, in a case in which the control unit 1302 is connected to the control unit of the vehicle through the interface unit 1304, the control unit 1302 may cause the control unit of the vehicle to drive the vehicle according to the route guidance information received from the server through the communication unit 1300 or the route guidance information generated by the route guidance performing unit 1310. Specifically, if the control unit 1302 receives the destination from the user, the control unit 1302 controls the positioning unit 1306 to determine the current position and controls the communication unit 1300 to transmit the destination and the current position to the server.

In addition, if the control unit 1302 receives the calculated driving route to the destination from the server through the communication unit 1300, the control unit 1302 stores the received driving route in the storage unit 1308 and controls the route guidance performing unit 1310 to perform the route guidance according to the received driving route.

Hereinafter, a route guidance apparatus and method according to still another exemplary embodiment of the present invention will be described. According to still another exemplary embodiment of the present invention, moving direction information of a lane on which the vehicle is currently driving and a moving direction of a future search link to which the vehicle is to move are compared with each other, thereby making it possible to provide lane change guidance to a driver or perform a lane change control of the vehicle. Hereinafter, the route guidance apparatus and method according to still another exemplary embodiment of the present invention will be described in detail with respect to portions that are different from the exemplary embodiments of the present invention described above.

Figure 14:
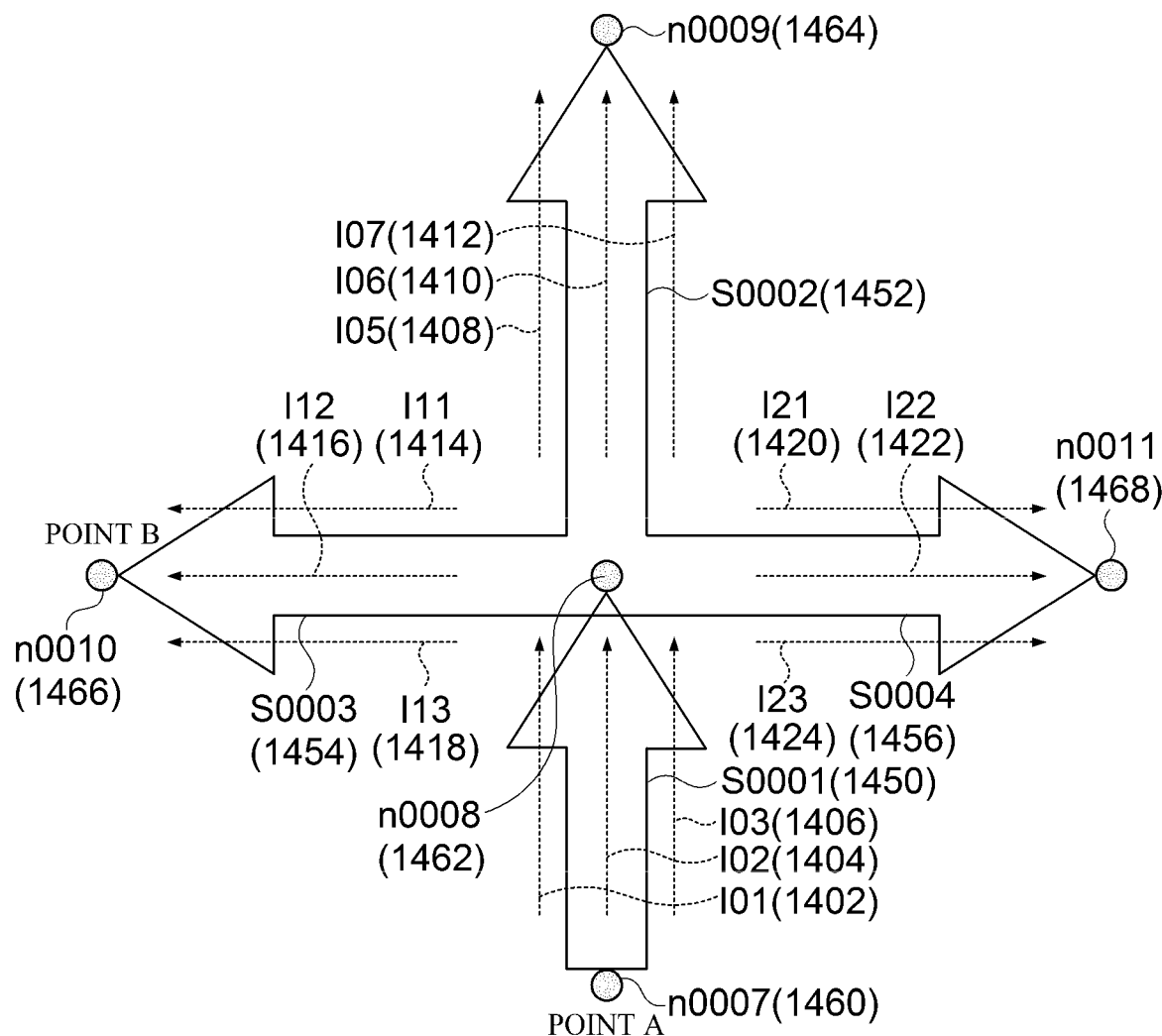
FIG. 14 is a diagram illustrating search links and lane links for describing a route guidance concept according to an exemplary embodiment of the present invention.

FIG. 14 is a diagram illustrating search links and lane links for describing a route guidance concept according to still another exemplary embodiment of the present invention.

In still another exemplary embodiment of the present invention, if the user inputs a departure point, a destination, and the like through an electronic device, a route guidance apparatus performs a route search. In this case, when the route guidance providing apparatus searches for a route for the entire driving route from the departure point to the destination, the route guidance providing apparatus searches for the route to the destination by considering only the roads, not lane information. In addition, during actual driving, the route guidance providing apparatus performs the route guidance by considering the respective lanes. As an example, when the route guidance apparatus performs an initial route search, the route guidance apparatus performs route guidance using only road link information, not the route search considering the moving direction of the lane. In addition, when the vehicle needs to make straight ahead on the driving route during actual driving, the route guidance device causes the vehicle to use a lane having straight direction information, and when the vehicle makes a left turn or a right turn, the route guidance apparatus may perform the route guidance or determine a moving direction of the vehicle so that the vehicle uses a lane having left turn direction information or right turn direction information.

The terms search link, lane link, search link identifier, lane link identifier, and node used in FIG. 14 will be used in the same manner as the terms used in FIGS. 1 to 13 described above.

FIG. 14 illustrates a road shape of a four-way intersection on which four search links exist, and search link IDs for the search links, respectively, shown in FIG. 14 are S0001 1450, S0002 1452, S0003 1454, and S0004 1456. In addition, in FIG. 14, each search link includes a plurality of lane links, and for example, the search link S0001 1450 includes lane links having lane link IDs of I01 1402, I02 1404, and I03 1406, and the search link S0002 1452 includes lane links having lane link IDs of I05 1408, I06 1410, and I07 1412. In addition, the search link S0003 1454 includes lane links having lane link IDs of I11 1414, I12 1416, and I13 1418, and the search link S0004 1456 includes lane links having lane link IDs of I21 1420, I22 1422, and I23 1424.

In addition, moving direction information of the vehicle is set in advance in each lane link, and it is preferable that such moving direction information of the vehicle is maintained as the latest information every time moving direction information of the lane is changed by a road construction or the like. As an example, in FIG. 14, I01 1402 is determined in advance as a left turn lane, I02 1404 is determined in advance as a straight ahead lane, and I03 1406 is determined in advance as a right turn lane.

In FIG. 14, n0007 1460, n0008 1462, n0009 1464, n0010 1466, and n0011 1468 correspond to nodes, and the node and the node are connected by a link.

It is assumed in FIG. 14 that the vehicle needs to move a point A to a point B on a driving route. Therefore, in FIG. 14, the route guidance apparatus confirms a lane link (any one of l01 1402 to l03 1406) on which the vehicle is currently positioned, and confirms the search link S0001 1450 including the confirmed lane link. In addition, the route guidance apparatus confirms n0007 1460, which is a start node of S0001 1450 and n0008 1462, which is an end node thereof, and then confirms S0003 1454, which is the search link positioned on the driving route to the Point B among the search links (S0002 1452, S0003 1454, and S0004 1456) exiting from n0008 1462.

In FIG. 14, since S0003 1454 has a moving direction of a left turn direction from n0008 1462, the route guidance apparatus according to still another exemplary embodiment of the present invention may perform the lane change guidance by determining whether the moving direction information of the lane link on which the vehicle is currently positioned and the moving direction of S0003 1454 coincide with each other. Specifically, the route guidance apparatus may perform the lane change guidance or perform the lane change control depending on whether the vehicle is currently positioned on any lane of l01 1402, l02 1404, and l03 1406. For example, if the vehicle is currently positioned on a lane corresponding to l03 1406 having right turn moving direction information or positioned on l02 1404 having straight ahead moving direction information, the route guidance apparatus controls the vehicle to perform the lane change guidance to change the lane to l01 1402 having the left turn moving direction information, or perform a lane change operation of the vehicle.

In still another exemplary embodiment of the present invention, S0001 1450, which is the search link corresponding to the road on which the vehicle is currently driving, is referred to as a current search link, and S0003 1454, which is a search link to be driven by the vehicle as a connected search link on the driving route among search links exiting from an end node of a current search link is referred to as a future search link.

In still another exemplary embodiment of the present invention, since the search links and the lane links are used for route guidance, data for the search links and the lane links may be configured as shown in Tables 7 and 8, and the data for the search links and the lane links may also be stored together with map data in the route guidance apparatus and may also be stored in a server that provides a route guidance service.

TABLE 7

Search Link

| Field Name | Description | Remark |
|---|---|---|
| SID | Search Link ID | Unique Value on Entire Map Data |
| Node1 | Node ID 1 | Start Node of Search Link |
| Node2 | Node ID 2 | End Node of Search Link |

Table 7 shows a data structure including a search link and information on a start node and an end node included in the search link. Referring to Table 7, a search link ID (SID), which is a search link identifier, has a unique value. In addition, one search link includes at least two nodes, one node representing the start node from which the search link starts, and other node representing the end node at which the search link ends.

Meanwhile, Table 8 below is a table showing a data structure of a lane link according to still another exemplary embodiment of the present invention. In Table 8 below, a lane link ID (LID), which is a lane link identifier, has a unique value. The lane link ID (LID) may also have the unique value on the entire map data, and may also have the unique value only within the search link. In Table 8 below, a search link ID (SID) shows the search link including the lane link ID (LID), a direction shows lane moving direction information which may be assigned to each lane link ID (LID).

TABLE 8

Lane Link

| Field Name | Description | Remark |
|---|---|---|
| LID | Lane Link ID | Unique |
| SID | Search Link ID | Referring to DB of Search Link |
| Direction | Lane Moving Direction Information | Straight Ahead Right Turn Left Turn Straight Ahead and Right Turn Straight Ahead and Left Turn Left Turn and U-Turn U-Turn Lane Change - Join to Left Lane Change - Join to Right |

As an example, data on the search links S0001 1450 and S0003 1454, the lane links l01 to l03 1402, 1404, and 1406, and l11 to l13 1414, 1416, and 1418 may be shown as in Tables 9 and 10.

TABLE 9

| SID | Node1 | Node2 |
|---|---|---|
| S0001 | n0007 | n0008 |
| S0002 | n0008 | n0009 |
| S0003 | n0008 | n0010 |
| S0004 | n0008 | n0011 |

TABLE 10

| LID | SID | Lane Moving Direction Information |
|---|---|---|
| l01 | S0001 | Left Turn |
| l02 | S0001 | Straight Ahead |
| l03 | S0001 | Straight Ahead and Right Turn |
| l11 | S0003 | Right Turn |
| l12 | S0003 | Straight Ahead |
| l13 | S0003 | Straight Ahead |

In Table 9, Node 1 and Node 2 represent the start node and the end node of each search link identifier, and Table 10 shows a data structure including the search link identifier and lane moving direction information for each lane link identifier.

In still another exemplary embodiment of the present invention, since the search link is determined between the node and the node, the data on the search link includes information related to the node, but when the vehicle moves on the route, the moving direction information between the respective search links may be determined through a separate process according to the route without being separately stored in consideration of an increase in an amount of data. The data on the lane link includes information on a moving direction of the lane and includes information on the search link identifier corresponding thereto. In this case, the search link identifier corresponds to a search link about a road including the lane link identifier. Whether or not the lane is changed between the lane link identifiers is determined by using the moving direction between the search links and the moving direction information of the lane link identifier.

In still another exemplary embodiment of the present invention, since the route guidance is performed in units of lanes, the vehicle needs to be positioned on a lane on which the vehicle may change a direction when the vehicle needs to change the direction. As an example, if the vehicle needs to make the left turn, the vehicle needs to be positioned on a left turn lane before making the left turn, and the route guidance apparatus needs to guide the driver to change the lane to the left turn lane when the vehicle is positioned on a straight ahead or right turn lane.

Figure 16:
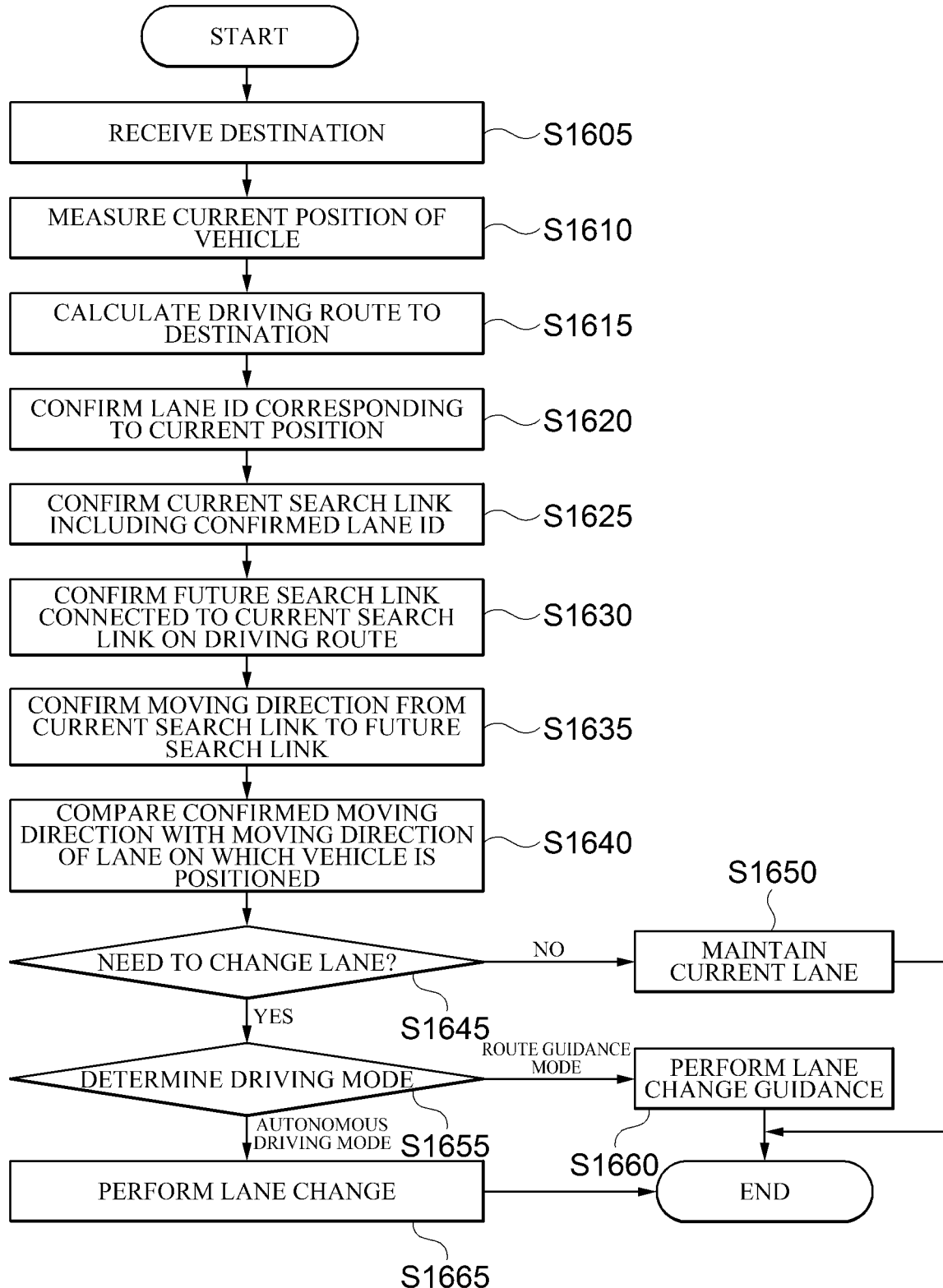
FIGS. 16 and 17 are diagrams for describing a route guidance method according to an exemplary embodiment of the present invention.
Figure 17:
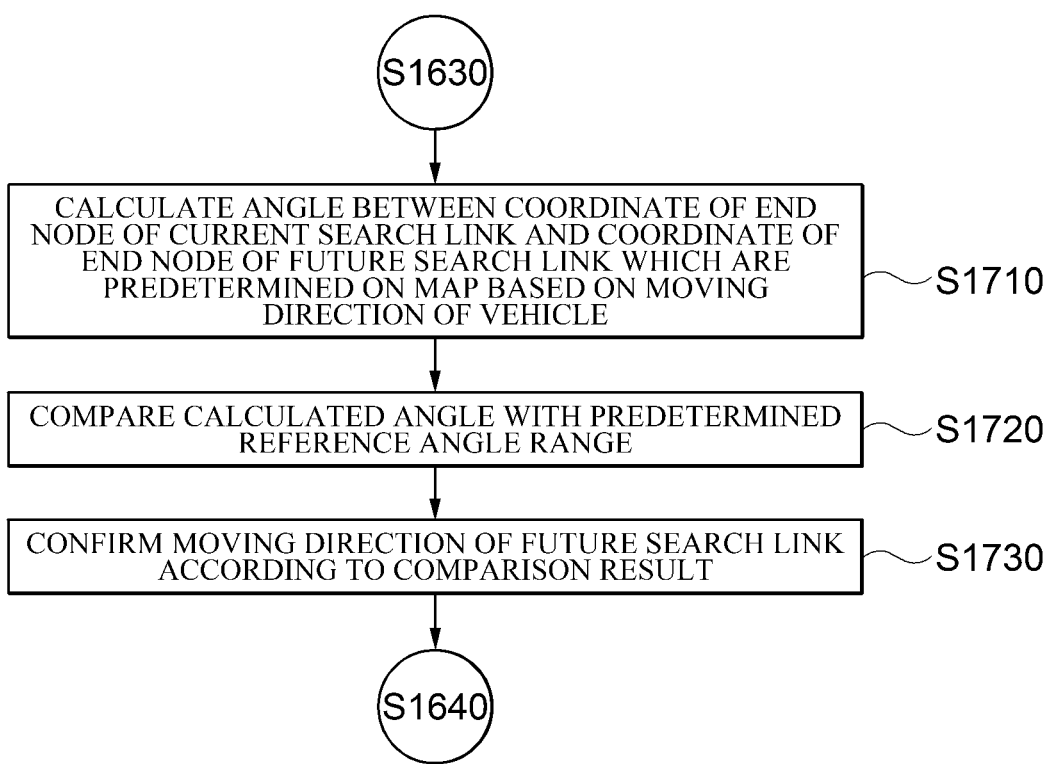

In addition, whether or not the vehicle needs to change the direction for safely changing the lane may require operation information of a next level in the current operating situation, and to this end, in still another exemplary embodiment of the present invention, the moving direction between the search links is calculated using angles as shown in FIGS. 16 and 17. That is, it may be determined whether or not the lane change of the vehicle is required to enter the future search link through the moving direction between the search links.

A method of determining the moving direction between the search links may use any one of the following four methods.

First, there is a method of recognizing directions of left turn, straight ahead, right turn, and the like based on rotation angles between the search links. As an example, in a case in which the vehicle moves from S0001 1450 to S0003 1454, since a rotation angle may be seen to be around 90 degrees to the left with respect to S0001 1450, the left turn may be determined, and in a case in which the vehicle moves from S0001 1450 to S0002 1452, since the rotation angle may be seen to be around 180 degrees with respect to S0001 1450, the straight ahead may be determined. In addition, in a case in which the vehicle moves from S0001 1450 to S0004 1456, since the rotation angle may be seen to be around 270 degrees, the right turn may be determined. In addition, the range of the rotation angle may be determined in advance. As an example, a predetermined range of rotation angles may be determined in advance such as 80 degrees to 100 degrees for left turn, 170 degrees to 190 degrees for straight ahead, and 260 degrees to 280 degrees for right turn, and the angles between the search links are recognized, thereby determining rotation direction information.

Figure 15:
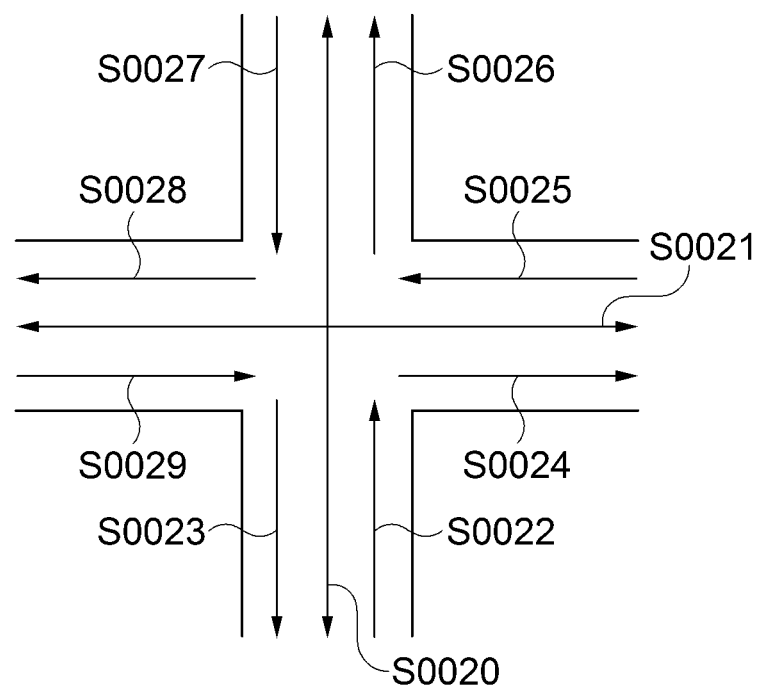
FIG. 15 is a diagram illustrating a direction change search link built in a four-way intersection according to an exemplary embodiment of the present invention.

As another method, direction change search links may be separately established. The direction change search links are lane links in which direction change information is pre-established in advance on the search links that may exist on the intersection. Referring to FIG. 15, assuming that a direction change search link is established in the case of a four-way intersection, two straight ahead search links S0020 and S0021 are established, and eight rotation search links S0022, S0023, S0024, S0025, S0026, S0027, S0028, and S0029 are established. In the case of using such a method, the route guidance apparatus calculates all of the search links included in the driving route when determining the driving route, and the vehicle has an advantage of driving only along the calculated search links so that a load in the route calculation may be reduced, but there is a problem that a large amount of data needs to be stored in advance.

As still another method, an intersection type and direction information may be determined in advance by typing the intersection to thereby determine the rotation direction information. As an example, an A-type intersection indicates a four-way intersection, information on four directions such as east, west, south, and north is set so as to correspond to intersection points, and the direction information may be determined in advance, such as right turn from the east to the north, left turn from the east to the south, and straight ahead from the east to the west. In addition, a B-type intersection indicates a three-way intersection, information on three directions such as east, south, and north is set so as to correspond to intersection points, and the direction information may be determined in advance, such as right turn from the east to the north and left turn from the east to the south.

As still another method, the rotation information may be determined by considering movable directions of the search links and the rotation angles between the search links. Referring to FIG. 14, the movable directions of S0001 1450 to S0004 1454 may be determined in advance as in Table 11 below.

TABLE 11

| SID | Node1 | Node2 | Direction |
|---|---|---|---|
| S0001 | n0007 | n0008 | Left, Straight, and Right |
| S0002 | n0008 | n0009 | Straight and Right |
| S0003 | n0008 | n0010 | Left, Straight, and Right |
| S0004 | n0008 | n0011 | Straight and Right |

In this case, 'left' represents the left turn, 'straight' represents the straight ahead, and 'right' represents the right turn. Therefore, 'left, straight, and right' represents that the left turn, the straight ahead, and the right turn are possible, and 'straight and right' represents that the straight ahead and the right turn are possible.

Referring again to FIG. 14, in a case in which the vehicle moves from S0001 1450 to S0004 1456, since S0001 1450 is the search link in which the left turn, the straight ahead, and the right turn are possible, the sizes of the rotation angles from S0001 1450 to S0003 1454, S0002 1452, and S0004 1456 are compared. That is, the rotation angle from S0001 1450 to S0003 1454 is the smallest, and the rotation angle increases in the order of the rotation angle from S0001 1450 to S0002 1452, and the rotation angle from S0001 1450 to S0004 1456. Therefore, in a case in which the vehicle moves from S0001 1450 to S0003 1454, since S0003 1454 is positioned at a first position in the clockwise direction from S0001 1450, the left turn may be determined, in a case in which the vehicle moves from S0001 1450 to S0002 1452, since S0002 1452 is positioned at a second position in the clockwise direction from S0001 1450, the straight ahead may be determined, and in a case in which the vehicle moves from S0001 1450 to S0004 1456, since S0004 1456 is positioned at a third position in the clockwise direction from S0001 1450, the right turn may be determined.

FIG. 16 is a flowchart of a route guidance method of a route guidance apparatus according to still another exemplary embodiment of the present invention.

If the route guidance apparatus receives a destination from a user in S1605, the route guidance apparatus measures a current position of the vehicle in S1610, and calculates a route from the measured current position to the destination received from the user in S1615. In S1620, the route guidance apparatus confirms a lane identifier corresponding to the current position. In this case, the route guidance apparatus may confirm which lane the vehicle is positioned by utilizing auxiliary devices such as advanced GNSS, an inertial navigation system (INS), an inertial measurement unit (IMU), and a distance measuring instrument (DMI) that may secure the lane corresponding to the current position with position accuracy of a level of 10 to 25 cm. Specifically, in still another exemplary embodiment of the present invention, the route guidance apparatus may confirm a lane link on which the vehicle is currently positioned by substituting a position coordinate (x, y) of the vehicle measured in the above-described method into Equation 1 below.

$$L(x,y)-\alpha \leq C(x,y) \leq L(x,y)+\alpha \quad \text{[Equation 1]}$$

In Equation 1, C(x, y) is a position on a map data coordinate corresponding to the currently measured position of the vehicle, L(x, y) denotes a position of a lane link corresponding to the currently measured position of the vehicle, and α is a position matching tolerance. That is, if the currently measured position of the vehicle is positioned within a predetermined range from the position of the lane link confirmed by the position coordinate of the vehicle, the route guidance apparatus may confirm that the position of the vehicle is matched to the confirmed position of the lane link.

The route guidance apparatus confirms a current search link including the confirmed lane identifier in S1625, confirms a future search link connected to the current search link on the driving route in S1630, and confirms a moving direction from the current search link to the future search link in S1635.

A process of the route guidance apparatus confirming the moving direction from the current search link to the future search link in S1635 will be described with reference to FIGS. 18 and 19.

Figure 18:
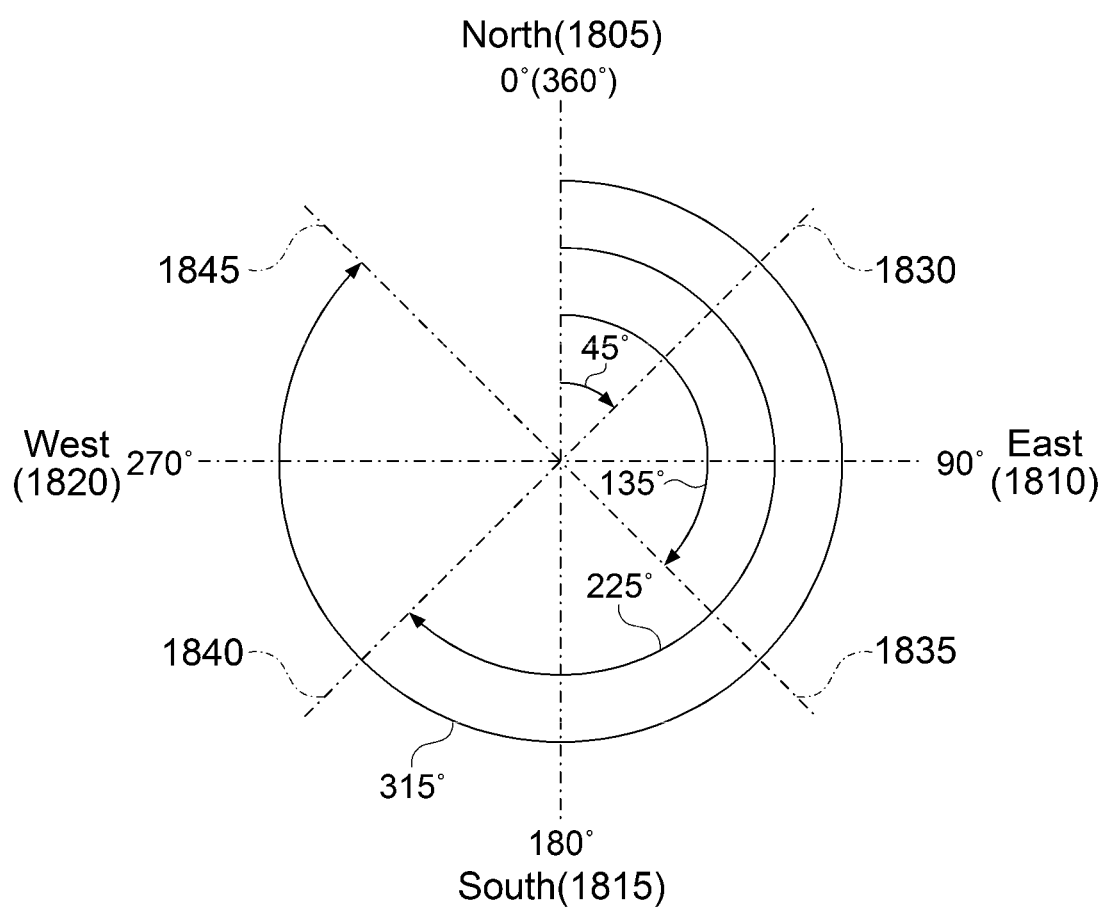
FIGS. 18 and 19 are diagrams for describing a process of confirming a moving direction from a current search link to a future search link in a route guidance apparatus according to another exemplary embodiment of the present invention.
Figure 19:
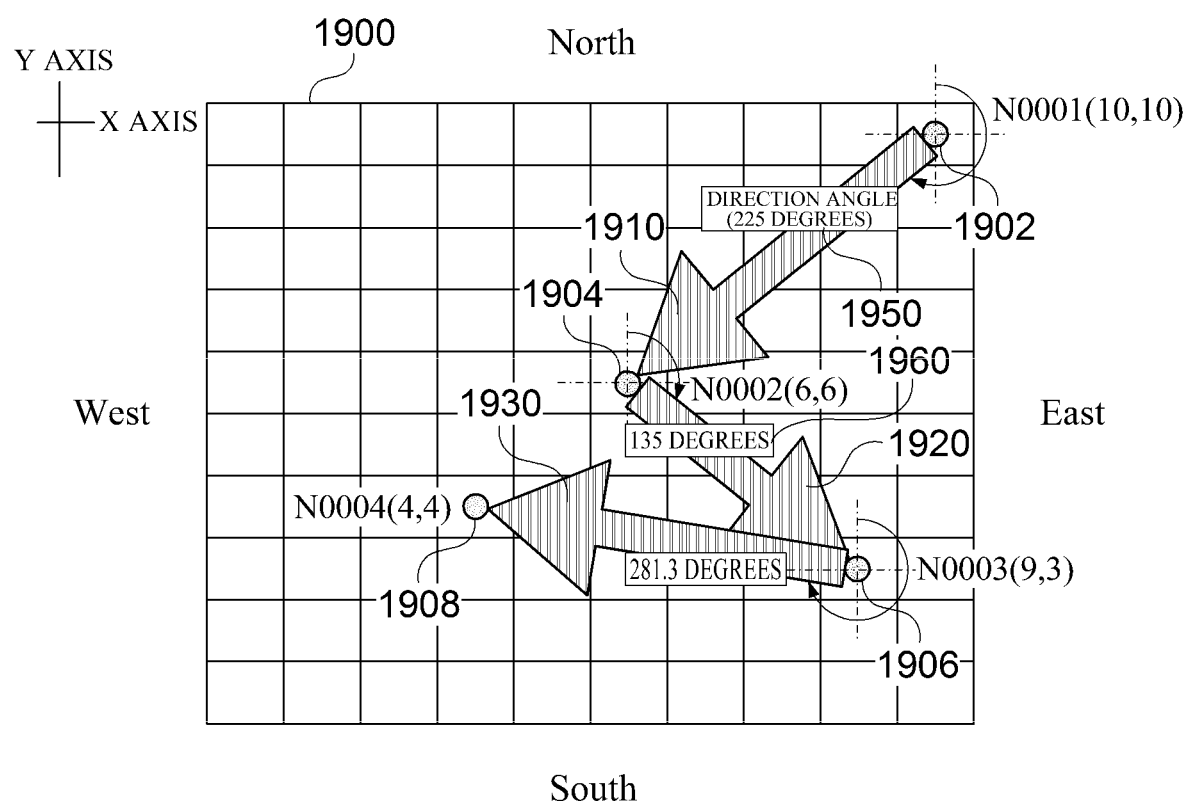

FIGS. 18 and 19 are diagrams for describing a process of confirming a moving direction from a current search link to a future search link in a route guidance apparatus according to still another exemplary embodiment of the present invention.

Referring to 18, it may be seen that east 1810, west 1820, south 1815, and north 1805 are positions around an origin, which is the same as the configuration of the map data. In FIG. 18, the north 1805 is positioned at 0 degrees (360 degrees) from the origin, the east 1810 is positioned at 90 degrees from the origin, the south 1815 is positioned at 180 degrees from the origin, and the west 1820 is positioned at 270 degrees from the origin. In still another exemplary embodiment of the present invention, when the moving direction of the vehicle is determined, an angle between a coordinate of an end node of the current search link and a coordinate of an end node of the future search link is calculated. The angle between the coordinate of the end node of the current search link and the coordinate of the end node of the future search link may be calculated through a tangent function of a trigonometric function.

Referring again to FIG. 18, if the angle between the coordinate of the end node of the current search link and the coordinate of the end node of the future search link calculated through the tangent function is between 45 degrees (1830) and 135 degrees (1835) based on the moving direction, the route guidance apparatus determines a right turn direction, if the calculated angle is between 225 degrees (1840) and 315 degrees (1845) based on the moving direction, the route guidance apparatus determines a left turn direction, and if the calculated angle is between 315 degrees (1845) and 45 degrees (1830) based on the moving direction, the route guidance apparatus determines a straight ahead direction.

FIG. 19 describes an actual driving route by using, for example, a relationship between angles between coordinates between the search links and the moving directions between the search links.

In FIG. 19, reference numeral 1900 denotes map data, and is expressed in a coordinate form for convenience of understanding. In FIG. 19, it is assumed that the vehicle start from a node N0001 1902 having a coordinate value (10, 10), passes through N0002 1904 having a coordinate value (6, 6) and N0003 1906 having a coordinate value (9, 3), and drives up to N0004 1908 having a coordinate value (4, 4).

In this case, the vehicle needs to change the moving direction at N0002 1904 and N0003 1906, respectively, and accordingly, in still another exemplary embodiment of the present invention, the vehicle needs to change a lane according to the moving direction of the search link.

In FIG. 19, since an angle between an end node N0002 1904 of a current search link 1910 and an end node N0002 1904 of a future search link 1920 connected to the current search link 1910 is 135 degrees (1950), the route guidance apparatus may confirm that a moving direction from the current search link 1910 to the future search link 1920 is the left turn direction as described in FIG. 18, and accordingly, if the moving direction information of the lane on which the vehicle is currently positioned is not the left turn direction, the route guidance apparatus may perform the lane change guidance or perform the lane change control.

In addition, if the vehicle is positioned on a search link with reference numeral 1920, the end node of the current search link is N0003 1906 and the end node of the future search link is N0004 1908. Since an angle between the two nodes is 281.3 degrees, the route guidance apparatus may confirm that a moving direction from the current search link 1920 to the future search link 1930 is the right turn direction as described in FIG. 18, and accordingly, if the moving direction information of the lane on which the vehicle is currently positioned is not the right turn direction, the route guidance apparatus may perform the lane change guidance or perform the lane change control.

Again, in S1640 of FIG. 16, the route guidance apparatus compares the moving direction confirmed in S1635 with the moving direction of the lane on which the vehicle is positioned, and determines whether or not it is necessary to change the lane in S1645.

S1640 will be described in detail with reference to FIG. 17. In FIG. 17, the route guidance apparatus calculates an angle between a coordinate of an end node of the current search link and a coordinate of an end node of the future search link which are predetermined on the map based on the moving direction of the vehicle in S1710, and compares the calculated angle with a predetermined reference angle range in S1720. In addition, in S1730, the route guidance apparatus confirms a moving direction of the future search link according to the comparison result of S1720.

If it is unnecessary to change the lane in S1645, the route guidance apparatus guides the driver to maintain the current lane in S1650 because the moving direction information of the lane on which the vehicle is currently positioned coincides with the moving direction of the future search link.

On the other hand, if it is necessary to change the lane in S1645, the route guidance apparatus determines whether the driving mode is a route guidance mode or an autonomous driving mode in S1655. As a result of the determination of S1655, if the current driving mode of the vehicle is the route guidance mode, the route guidance apparatus guides the driver to change the lane to a lane having moving direction information coinciding with the moving direction of the search link in S1660. However, as the result of the determination of S1655, if the current driving mode of the vehicle is the autonomous driving mode, the route guidance apparatus performs the lane change to the lane having the moving direction information coinciding with the moving direction of the search link in S1665.

Meanwhile, still another exemplary embodiment of the present invention described with reference to FIGS. 14 to 19 may be implemented by using the route guidance apparatus and the server. As an example, in a case in which the route guidance apparatus may not communicate with the server, still another exemplary embodiment of the present invention described with reference to FIGS. 14 to 19 may be implemented by using only the route guidance apparatus. As another example, in a case in which the route guidance apparatus may communicate with the server, still another exemplary embodiment of the present invention described with reference to FIGS. 14 to 19 may be implemented by using the route guidance apparatus and the server. This will be described in more detail with reference to FIGS. 20 and 21.

Figure 20:
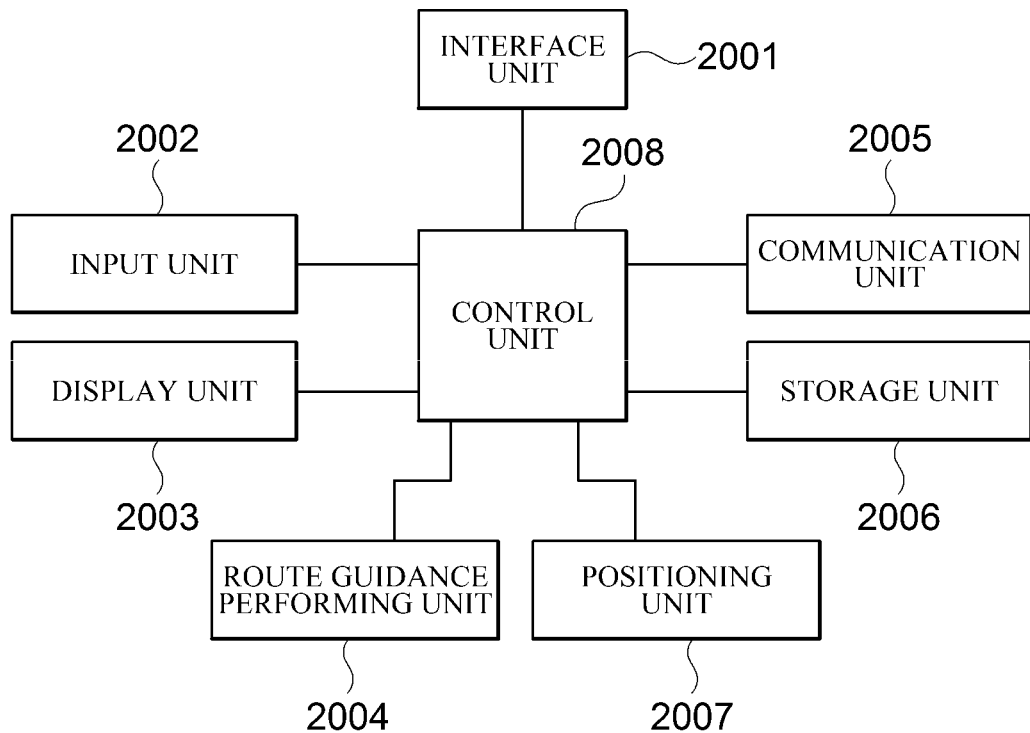
FIG. 20 is a diagram illustrating a configuration of a route guidance apparatus according to another exemplary embodiment of the present invention.

FIG. 20 is a block diagram illustrating a route guidance apparatus for implementing still another exemplary embodiment of the present invention described in FIGS. 14 to 19. Referring to FIG. 20, a route guidance apparatus according to still another exemplary embodiment of the present invention includes all or some of an interface unit 2001, an input unit 2002, a display unit 2003, a route guidance performing unit 2004, a communication unit 2005, a storage unit 2006, a positioning unit 2007, and a control unit 2008. Here, the units constituting the route guidance apparatus according to still another exemplary embodiment of the present invention may perform the functions of the units of the same name shown in FIGS. 2 and 13. Specifically, the communication unit 2005 may perform data transmission and reception with a server via a mobile communication network, a wireless communication network, or the like. In addition, the interface unit 2001 is connected to a control unit (not shown) of the vehicle that controls the overall operation of electrical, electronic, and mechanical parts of the vehicle to transmit and receive various control information and data. In addition, the input unit 2002 may receive a user input such as a destination input or the like. In addition, the display unit 2003 may display route information using high-precision map data. In addition, the storage unit 2006 may store various data and programs required for operation of the route guidance apparatus. In addition, the positioning unit 2007 may measure a current position through GPS or GNSS to generate position information. In addition, the route guidance performing unit 2004 may generate route information from the current position of the vehicle to the destination, and perform route guidance for the driver based on the generated route information. In addition, the control unit 2008 may control a general operation of the route guidance apparatus and control to perform a route guidance service.

Figure 21:
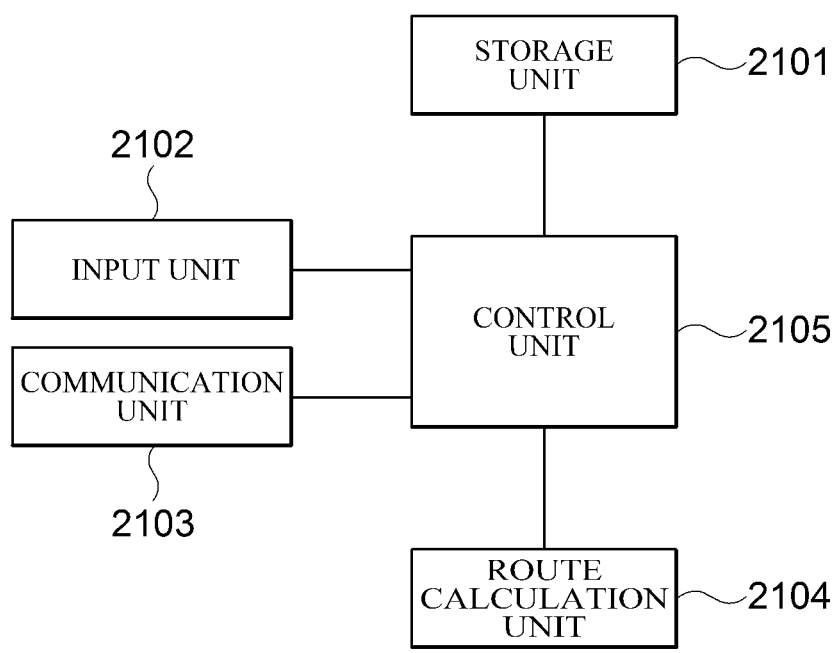
FIG. 21 is a diagram illustrating a configuration of a server according to another exemplary embodiment of the present invention.

Meanwhile, FIG. 21 is a block diagram illustrating a server for implementing still another exemplary embodiment of the present invention described in FIGS. 14 to 19. Referring to FIG. 21, a server according to still another exemplary embodiment of the present invention includes all or some of a storage unit 2101, an input unit 2102, a communication unit 2103, a route calculation unit 2104, and a control unit 2105. Here, the units constituting the server according to still another exemplary embodiment of the present invention may perform the functions of the units of the same name shown in FIGS. 3 and 10. Specifically, the storage unit 2101 may store various data and programs required for operation of the server. The input unit 2102 may receive a command or the like for performing an operation from the user. The communication unit 2103 may provide a function for communicating with other apparatuses such as the route guidance apparatus and the like. The route calculation unit 2104 may generate route information from a current position of the vehicle to the destination. In addition, the control unit 2105 may control a general operation of the server and control to perform a route guidance service.

The route guidance method according to another exemplary embodiment of the present invention shown in FIGS. 14 to 19 may be implemented by using at least one of the route guidance apparatus and the server.

As an example, a route guidance system according to another exemplary embodiment of the present invention may be implemented without a server. In this case, if the user inputs a departure point, a destination, and the like to the route guidance apparatus, the positioning unit 2007 of the route guidance apparatus may measure a current position of the vehicle and the route guidance performing unit 2004 may calculate a route from the measured current position to the destination input from the user. In addition, the route guidance performing unit 2004 may confirm a lane identifier corresponding to the current position. In addition, the route guidance performing unit 2004 may confirm a current search link including the confirmed lane identifier, confirm a future search link connected to the current search link on the driving route, and confirm a moving direction from the current search link to the future search link. Here, a method of confirming the moving direction from the current search link to the future search link may be performed by using one of the various methods described above. As an example, the route guidance performing unit 2004 may calculate an angle between a coordinate of an end node of the current search link and a coordinate of an end node of the future search link which are predetermined on the map based on the moving direction of the vehicle, and compare the calculated angle with a predetermined reference angle range. In addition, the route guidance performing unit 2004 may confirm a moving direction of the future search link according to the comparison result. Meanwhile, if the moving direction is confirmed, the route guidance performing unit 2004 may compare the confirmed moving direction with the moving direction of the lane on which the vehicle is positioned, and determine whether or not it is necessary to change the lane. If it is unnecessary to change the lane, the route guidance performing unit 2004 may guide the driver to maintain the current lane because the moving direction information of the lane on which the vehicle is currently positioned coincides with the moving direction of the future search link. On the other hand, if it is necessary to change the lane, the route guidance performing unit 2004 may guide the driver to change the lane to a lane having moving direction information coinciding with the moving direction of the search link.

Meanwhile, according to another exemplary embodiment of the present invention, the route guidance system according to another exemplary embodiment of the present invention may be implemented using the server. In this case, the route calculation up to the destination may be performed in the server and may be then provided to the route guidance apparatus such as navigation mounted in the vehicle or a terminal providing a navigation function. Specifically, if the user inputs a departure point, a destination, and the like to the route guidance apparatus, the server may search for a route from the departure point to the destination. When the server searches for the route, the route calculation unit 2104 may calculate a route from the current position of the vehicle to the destination input from the user, confirm a lane identifier corresponding to the current position, confirm a current search link including the confirmed lane identifier, confirm a future search link connected to the current search link on the driving route, and confirm a moving direction from the current search link to the future search link. If driving route information from the current position of the vehicle to the destination is generated according to such a process, the server may transmit the generated driving route information to the route guidance apparatus and the route guidance apparatus may perform the route guidance by using the driving route information received from the server.

Hereinabove, the present invention has been described with reference to the exemplary embodiments. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that all flowcharts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors, and some of them may be shared with each other.

In the specification and the claims, terms such as "first", "second", "third", "fourth", and the like, if any, will be used to distinguish similar components from each other and be used to describe a specific sequence or a generation sequence, but is not necessarily limited thereto. It will be understood that these terms are compatible with each other under an appropriate environment so that exemplary embodiments of the present invention set forth herein may be operated in a sequence different from a sequence illustrated or described herein. Likewise, in the case in which it is described herein that a method includes a series of steps, a sequence of these steps suggested herein is not necessarily a sequence in which these steps may be executed. That is, any described step may be omitted and/or any other step that is not described herein may be added to the method.

In addition, terms "module" and "unit" for components used in the present specification are used only in order to easily make the disclosure. Therefore, these terms do not have meanings or roles that distinguish from each other in themselves.

In addition, terms used in the present specification are for explaining exemplary embodiments rather than limiting the present invention. In the present specification, a singular form includes a plural form unless explicitly described to the contrary. Components, steps, operations, and/or elements mentioned by terms "comprise" and/or "comprising" used in the present specification do not exclude the existence or addition of one or more other components, steps, operations, and/or elements.

In addition, the methods according to the various exemplary embodiments of the present invention described above may be implemented in an installation data form and be provided in servers or devices in a state in which they are stored in various non-transitory computer readable media. Therefore, the respective apparatuses may access the servers or the devices in which the installation data are stored to download the installation data.

The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

In addition, although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

The invention claimed is:

1. A method for route guidance, the method comprising:
receiving a destination from a user;
determining a current position of a vehicle;
calculating a driving route from the current position to the destination;
when an intersection exists within in a predetermined distance on the driving route while performing the route guidance according to the calculated driving route, confirming a ranking of a search link positioned on the calculated driving route among search links exiting from an end node corresponding to the intersection;
comparing rotation direction information of the search link corresponding to the confirmed ranking of the search link with moving direction information of a lane of a lane link corresponding to the lane on which the vehicle is currently positioned; and
performing lane change guidance of the vehicle according to a comparison result of the rotation direction information and the moving direction information, wherein the confirming of the ranking of the search link includes:
sequentially searching for the search links exiting from the end node in a clockwise direction or a counterclockwise direction based on the end node or the search link corresponding to the current position of the vehicle; and
assigning the ranking to each of the search links exiting from the end node based on a searching order, and confirming the ranking of the search link positioned on the calculated driving route,
wherein the rotation direction information indicating a drivable direction from the search link corresponding to the current position of the vehicle to a next search link is defined in each of the search links according to the order, and
wherein the rotation direction information and the moving direction information are determined in advance and stored for providing information for safely changing the lane to the user in advance according to a position of the user during the route guidance.

2. The method of claim 1, wherein the confirming of the ranking of the search link includes:
confirming a lane link identifier of the lane on which the vehicle is positioned;
confirming a search link identifier including the confirmed lane link identifier; and
confirming the number of search links exiting from an end node of a search link corresponding to the confirmed search link ID.

3. The method of claim 2, wherein the comparing of the rotation direction information with the moving direction information includes:
confirming the rotation direction information corresponding to the order of the search link coinciding the search link positioned on the driving route among the searched search links; and
comparing whether or not the confirmed rotation direction information coincides with the moving direction information corresponding to the lane on which the vehicle is positioned.

4. The method of claim 2, wherein the comparing of the rotation direction information with the moving direction information includes:
confirming rotation direction information corresponding to a search link coinciding with the search link positioned on the driving route among the searched search links; and
confirming whether or not the confirmed rotation direction information includes the moving direction information corresponding to the lane on which the vehicle is positioned.

5. The method of claim 4, wherein the performing of the lane change guidance of the vehicle includes: when as the comparison result, the rotation direction information of the search link corresponding to the confirmed ranking of the search link does not include the moving direction information of the lane on which the vehicle is positioned,
determining a driving lane having moving direction information coinciding with the rotation direction information of the search link corresponding to the confirmed ranking of the search link; and
providing lane change guidance to the determined driving lane.

6. The method of claim 1, wherein the performing of the lane change guidance of the vehicle includes: when as the comparison result, the rotation direction information of the search link corresponding to the confirmed ranking of the search link does not coincide with the moving direction information of the lane on which the vehicle is positioned,
determining a driving lane having moving direction information coinciding with the rotation direction information of the search link corresponding to the confirmed ranking of the search link; and
providing lane change guidance to the determined driving lane.

7. The method of claim 1, wherein the destination and the current position of the vehicle are received through a user terminal.

8. The method of claim 1, wherein the performing of the lane change guidance of the vehicle according to the comparison result of the rotation direction information and the moving direction information includes:
transmitting a guidance message for lane change of the vehicle to a control unit of the vehicle; and
performing, by the control unit of the vehicle, an operation associated with the lane change according to the guidance message.

9. An apparatus for route guidance, the apparatus comprising:
a route calculation unit;
a communication unit performing communication with a user terminal provided in a vehicle; and
a control unit obtaining destination information of the vehicle and position information of the vehicle through the communication unit, controlling the route calculation unit to calculate a driving route from a current position to a destination, and transmitting the calculated driving route to the user terminal through the communication unit,
wherein the route calculation unit is configured to:
when an intersection exists within in a predetermined distance on the driving route while performing the route guidance according to the calculated driving route, confirm a ranking of a search link positioned on the calculated driving route among search links exiting from an end node corresponding to the intersection;
compare rotation direction information of the search link corresponding to the confirmed ranking of the search link with moving direction information of a lane of a lane link corresponding to the lane on which the vehicle is currently positioned; and
perform lane change guidance of the vehicle according to a comparison result of the rotation direction information and the moving direction information,
wherein the route calculation unit is further configured to:
sequentially search for the search links exiting from the end node in a clockwise direction or a counterclockwise direction based on the end node or the search link corresponding to the current position of the vehicle; and
assign the ranking to each of the search links exiting from the end node based on a searching order, and confirm the ranking of the search link positioned on the calculated driving route,
wherein the rotation direction information indicating a drivable direction from the search link corresponding to the current position of the vehicle to a next search link is defined in each of the search links according to the order, and
wherein the apparatus is configured to determine the rotation direction information and the moving direction information in advance and store for providing information for safely changing the lane to the user in advance according to a position of the user during the route guidance.

10. The apparatus of claim 9, wherein the route calculation unit is configured to:
confirm a lane link identifier of the lane on which the vehicle is positioned;
confirm a search link identifier including the confirmed lane link identifier; and
confirm the number of search links exiting from an end node of a search link corresponding to the confirmed search link ID.

11. The apparatus of claim 10, wherein the route calculation unit is configured to:
confirm the rotation direction information corresponding to the order of the search link coinciding the search link positioned on the driving route among the searched search links; and
compare whether or not the confirmed rotation direction information coincides with the moving direction information corresponding to the lane on which the vehicle is positioned.

12. The apparatus of claim 9, wherein the route calculation unit is configured to:
when as the comparison result, the rotation direction information of the search link corresponding to the confirmed ranking of the search link does not coincide with the moving direction information of the lane on which the vehicle is positioned,
determine a driving lane having moving direction information coinciding with the rotation direction information of the search link corresponding to the confirmed ranking of the search link; and
provide lane change guidance to the determined driving lane.

13. The apparatus of claim 9, wherein the route calculation unit transmits a guidance message for lane change of the vehicle to a control unit of the vehicle, and
the control unit of the vehicle performs an operation associated with the lane change according to the guidance message.

14. The apparatus of claim 9, further comprising a storage unit storing map information for guiding a route on which the vehicle drives, storing information on search links and information on lane links existing on the map information, and storing rotation direction information corresponding to the search links and moving direction information corresponding to the lane links.

15. A method for route guidance, the method comprising:
receiving a destination from a user;
measuring a current position of a vehicle;
calculating a driving route from the measured current position to the destination;
confirming a search link on which the vehicle is currently driving and a future search link connected to a current search link on which the vehicle is currently driving and positioned on the driving route, while the vehicle drives on a route according to the calculated driving route;
confirming a moving direction from the current search link to the future search link;
comparing the confirmed moving direction to the future search link with moving direction information of a lane on the search link on which the vehicle is currently driving; and
determining whether to change the lane of the vehicle according to a comparison result of the confirmed moving direction and the moving direction information,
wherein the driving route includes at least two search links for the driving route from the measured current position to the destination, and
wherein the moving direction information are determined in advance and stored for providing information for safely changing the lane to the user in advance according to a position of the user during the route guidance.

16. The method of claim 15, wherein the confirming of the future search link includes:
identifying a current search link identifier of a road corresponding to the measured current position of the vehicle; and
confirming the future search link positioned to be connected to the current search link according to the driving route among search links exiting from an end node of the identified current search link identifier.

17. The method of claim 15, wherein the confirming of the moving direction includes:
calculating an angle between a coordinate of an end node of the current search link and a coordinate of an end node of the future search link which are predetermined on a map based on the moving direction of the vehicle; and
confirming the moving direction according to whether or not the calculated angle is included in a predetermined angle range.

18. The method of claim 17, wherein the angle is calculated by using a tangent function.

19. The method of claim 17, wherein the moving direction is:
a right turn direction when the calculated angle is between 45 degrees and 135 degrees based on the moving direction,
a left turn direction when the calculated angle is between 225 degrees and 315 degrees based on the moving direction,
a straight ahead direction when the calculated angle is between 315 degrees and 45 degrees, and
a U-turn direction when the calculated angle is between 135 degrees and 225 degrees.

20. The method of claim 15, wherein the performing of the lane change guidance includes:
determining a lane corresponding to a lane identifier having moving direction information coinciding the moving direction, when the moving direction and the moving direction information are different from each other; and
guiding the user to change the lane to the determined lane.

* * * * *